(12) United States Patent
Koshi et al.

(10) Patent No.: US 11,155,686 B2
(45) Date of Patent: Oct. 26, 2021

(54) FIBER-REINFORCED POLYAMIDE RESIN BASE, METHOD FOR PRODUCING SAME, MOLDED ARTICLE CONTAINING SAME, AND COMPOSITE MOLDED ARTICLE

(71) Applicant: Toray Industries, Inc., Tokyo (JP)

(72) Inventors: Masayuki Koshi, Nagoya (JP); Hiroyuki Ome, Nagoya (JP); Ken Sudo, Nagoya (JP); Kenichi Utazaki, Nagoya (JP)

(73) Assignee: TORAY INDUSTRIES, INC., Tokyo (JP)

(*) Notice: Subject to any disclaimer, the term of this patent is extended or adjusted under 35 U.S.C. 154(b) by 377 days.

(21) Appl. No.: 16/085,694

(22) PCT Filed: Mar. 24, 2017

(86) PCT No.: PCT/JP2017/012084
§ 371 (c)(1),
(2) Date: Sep. 17, 2018

(87) PCT Pub. No.: WO2017/170248
PCT Pub. Date: Oct. 5, 2017

(65) Prior Publication Data
US 2019/0071549 A1   Mar. 7, 2019

(30) Foreign Application Priority Data

Mar. 30, 2016 (JP) .............................. JP2016-067761
Mar. 30, 2016 (JP) .............................. JP2016-067762

(51) Int. Cl.
*C08J 5/04* (2006.01)
*C08G 69/14* (2006.01)
*C08K 7/02* (2006.01)
*C08L 77/00* (2006.01)
*C08G 69/26* (2006.01)
*B29B 15/08* (2006.01)
*C08K 3/04* (2006.01)
*B32B 7/12* (2006.01)
*B32B 27/08* (2006.01)
*B32B 27/34* (2006.01)
*B29K 77/00* (2006.01)
*B29K 309/08* (2006.01)

(52) U.S. Cl.
CPC .............. *C08J 5/042* (2013.01); *B29B 15/08* (2013.01); *B32B 7/12* (2013.01); *B32B 27/08* (2013.01); *B32B 27/34* (2013.01); *C08G 69/14* (2013.01); *C08G 69/26* (2013.01); *C08K 3/046* (2017.05); *C08K 7/02* (2013.01); *C08L 77/00* (2013.01); *B29K 2077/00* (2013.01); *B29K 2309/08* (2013.01); *B32B 2262/101* (2013.01); *C08J 2377/02* (2013.01); *C08J 2377/06* (2013.01)

(58) Field of Classification Search
None
See application file for complete search history.

(56) References Cited

U.S. PATENT DOCUMENTS

| 5,254,668 | A  |    | 10/1993 | Dominguez et al. |
|-----------|----|----|---------|------------------|
| 5,342,918 | A  |    | 8/1994  | Howelton et al.  |
| 2010/0267923 | A1 | * | 10/2010 | Cao ........................ C08J 11/02 |
|           |    |    |         | 528/336          |
| 2012/0178325 | A1 |   | 7/2012  | Wakeman et al.   |
| 2013/0062806 | A1 |   | 3/2013  | Mitadera         |
| 2013/0078402 | A1 |   | 3/2013  | Mitadera et al.  |
| 2013/0150490 | A1 |   | 6/2013  | Kopannia et al.  |
| 2014/0127521 | A1 | * | 5/2014  | Ishibashi ............ B29C 65/4815 |
|           |    |    |         | 428/474.7        |
| 2014/0135441 | A1 | * | 5/2014  | Sasaki .................... C08K 3/346 |
|           |    |    |         | 524/447          |
| 2017/0190839 | A1 |   | 7/2017  | Okubo et al.     |
| 2018/0371166 | A1 | * | 12/2018 | Sudo ...................... C08G 69/10 |

FOREIGN PATENT DOCUMENTS

| CN | 103562316 A | 2/2014 |
|----|-------------|--------|
| JP | 03292327 A  | 12/1991 |
| JP | 06145345 A  | 5/1994 |
| JP | 2000086759 A | 3/2000 |
| JP | 2012041526 A | 3/2012 |
| JP | 2013159675 A | 8/2013 |

(Continued)

OTHER PUBLICATIONS

Feng et al (Surface modification of recycled carbon fiber and its reinforcement effect on nylon 6 composites: Mechanical properties, morphology and crystallization behaviors, Current Applied Physics 13 (2013) 2038-2050). (Year: 2013).*

(Continued)

*Primary Examiner* — Rachel Kahn
(74) *Attorney, Agent, or Firm* — RatnerPrestia

(57) ABSTRACT

A fiber-reinforced polyamide resin base material comprises continuous reinforcing fibers, or comprises a reinforcing fiber base material in which discontinuous reinforcing fibers are dispersed, impregnated with a polyamide resin. In the polyamide resin, at least part of the polymer constituting the polyamide resin is an end-modified polyamide resin having, at an end group of the polymer, a structure constituted by a structural unit different from a repeating structural unit constituting the backbone of the polymer. A fiber-reinforced polyamide resin base material having an excellent impregnation property and thermal stability, less void, and excellent surface quality is provided.

14 Claims, No Drawings

(56) References Cited

FOREIGN PATENT DOCUMENTS

| JP | 2013532757 A | 8/2013 | |
|---|---|---|---|
| JP | 2013538265 A | 10/2013 | |
| WO | 2012140785 A | 10/2012 | |
| WO | 2015182693 A1 | 12/2015 | |
| WO | WO-2015182693 A1 * | 12/2015 | ............. C08G 69/40 |

OTHER PUBLICATIONS

International Search Report and Written Opinion for International Application No. PCT/JP2017/012084, dated Jun. 13, 2017—9 pages.
Smith, S., "The Re-equilibrium of Polycaproamide" Journal of Polymer Science, (1958), vol. XXX, pp. 459-478.
Chang, Y., "High Technology Composite Material Manufacturing Handbook," published by National Defense Publisher, 1st edition, May 2003, 4 pages, with partial English translation.
Chinese Office Action for Chinese Application No. 2017800174113, dated Jan. 6, 2021, with translation, 11 pages.

* cited by examiner

FIBER-REINFORCED POLYAMIDE RESIN BASE, METHOD FOR PRODUCING SAME, MOLDED ARTICLE CONTAINING SAME, AND COMPOSITE MOLDED ARTICLE

CROSS REFERENCE TO RELATED APPLICATIONS

This is the U.S. National Phase application of PCT/JP2017/012084, filed Mar. 24, 2017, which claims priority to Japanese Patent Application No. 2016-067761, filed Mar. 30, 2016, and Japanese Patent Application No. 2016-067762, filed Mar. 30, 2016, the disclosures of these applications being incorporated herein by reference in their entireties for all purposes.

FIELD OF THE INVENTION

The present invention relates to a fiber-reinforced polyamide resin base material, a method for producing it, and a molded article and a composite molded article containing it.

BACKGROUND OF THE INVENTION

Fiber-reinforced polyamide resin base materials containing continuous reinforcing fibers, or containing a reinforcing fiber base material in which discontinuous reinforcing fibers are dispersed, impregnated with a polyamide resin have excellent specific strength and specific rigidity, high weight-saving effect, and high heat resistance and chemical resistance, so that they are favorably used for a variety of uses such as transport equipments including aircrafts and automobiles; sporting goods; and electric or electronic parts. In recent years, due to an increased demand for weight saving, replacement of metal parts with resin parts and miniaturization and modularization of parts have been progressing mainly for uses in aircrafts and automobiles. Therefore, development of materials having excellent molding processability and mechanical characteristics is demanded.

Patent Document

Known examples of composite materials for structural materials having excellent moldability and mechanical characteristics include a carbon fiber-reinforced polyamide resin prepreg prepared by inclusion of carbon fibers in a polyamide resin (see, for example, Patent Document 1).
[Patent Document 1] JP 2013-159675 A

SUMMARY OF THE INVENTION

However, although the technique disclosed in Patent Document 1 is expected to provide high mechanical characteristics to enable production of light-weight materials, the technique requires a long time for impregnation of carbon fiber bundles with a polyamide resin, resulting in a low productivity. Therefore, further improvement of the impregnation property has been demanded. A polyamide resin shows a lower melt fluidity as the molecular weight increases. Therefore, when the resin is used for a fiber-reinforced polyamide resin base material, there are problems that a decreased impregnation property to reinforcing fiber bundles leads to increased void, and that occurrence of fluffing or an increase in resin-rich portions leads to deterioration of the surface quality. Although the melt fluidity can be increased by increasing the processing temperature, this causes a decrease in the thermal stability, leading to thermal decomposition accompanied by generation of gas during processing, which results in an increase in void or deterioration of the surface quality due to deterioration of the matrix resin, which is problematic. In view of this, an object of the present invention is to provide a fiber-reinforced polyamide resin base material having an excellent impregnation property and thermal stability, less void, and excellent surface quality.

In order to solve the above problems, the fiber-reinforced polyamide resin base material of the present invention has the following constitution. That is, the fiber-reinforced polyamide resin base material is a fiber-reinforced polyamide resin base material comprising continuous reinforcing fibers, or comprising a reinforcing fiber base material in which discontinuous reinforcing fibers are dispersed, impregnated with a polyamide resin, wherein in the polyamide resin, at least part of the polymer constituting the polyamide resin is an end-modified polyamide resin having, at an end group of the polymer, a structure constituted by a structural unit different from a repeating structural unit constituting the backbone of the polymer.

The method for producing the fiber-reinforced polyamide resin base material of the present invention has the following constitution. That is, the method is a method for producing the fiber-reinforced polyamide resin base material, the method at least comprising the steps of:

including, in polymerization of amino acid, lactam, and/or diamine and dicarboxylic acid, a terminal modification agent represented by the following General Formula (III) at 1 to 20% by mass with respect to the total of the amino acid, lactam, diamine, and dicarboxylic acid, and allowing the terminal modification agent to bind to an end(s) of a polyamide resin to obtain an end-modified polyamide resin containing an end structure represented by the following General Formula (I) at 1 to 20% by mass; and impregnating continuous reinforcing fibers, or a reinforcing fiber base material in which discontinuous-fiber reinforcing fibers are dispersed, with the end-modified polyamide resin.

$$H-X-(R^1-O)_m-R^2 \qquad (III)$$

$$-X-(R^1-O)_m-R^2 \qquad (I)$$

In the General Formulae (III) and (I), m represents a range of 2 to 100. $R^1$ represents a $C_2$-$C_{10}$ divalent hydrocarbon group, and $R^2$ represents a $C_1$-$C_{30}$ monovalent hydrocarbon group. In the General Formula (III), —X— represents —NH—, —N(CH$_3$)—, or —O(C=O)—. In the General Formula (I), —X— represents —NH—, —N(CH$_3$)—, or —(C=O)—. The $R^1$ of m-pieces contained in General Formula (III) may be either the same or different.

The molded article comprising the fiber-reinforced polyamide resin base material of the present invention has the following constitution. That is, the molded article is a molded article comprising the fiber-reinforced polyamide resin base material.

The composite molded article of the present invention has the following constitution. That is, the composite molded article is a composite molded article comprising the fiber-reinforced polyamide resin base material and a molded article containing a thermoplastic resin that are at least partly bonded to each other.

Preferably, in the fiber-reinforced polyamide resin base material of the present invention, the end-modified polyamide resin contains an end structure represented by the General Formula (I) in an amount of 1 to 20% by mass.

Preferably, in the fiber-reinforced polyamide resin base material of the present invention, the end-modified polyamide resin further contains an end structure represented by the following General Formula (II) in an amount of 0.1 to 5% by mass.

$$-Y-R^3 \quad (II)$$

In the General Formula (II), $R^3$ represents a $C_1$-$C_{30}$ monovalent hydrocarbon group. In cases where X in the General Formula (I) is —NH— or —N(CH$_3$)—, —Y— in the General Formula (II) represents —(C=O)—, and in cases where X in the General Formula (I) is —(C=O)—, Y in the General Formula (II) represents —NH— or —N(CH$_3$)—.

Preferably, in the fiber-reinforced polyamide resin base material of the present invention, the reinforcing fibers are continuously aligned in one direction, or are discontinuous fibers having a number average fiber length of 3 to 100 mm.

Preferably, in the fiber-reinforced polyamide resin base material of the present invention, the reinforcing fibers contain carbon fibers, and the reinforcing fibers are contained in an amount of 20 to 70% by volume.

Preferably, in the fiber-reinforced polyamide resin base material of the present invention, the end-modified polyamide resin contains a total of 60 to 250 [mol/t] of the end structure represented by General Formula (I) and the end structure represented by General Formula (II), and the ratio between the content [mol/t] of the end structure represented by General Formula (I) and the content [mol/t] of the end structure represented by General Formula (II) ((I)/(II)) is 0.3 to 2.5.

Preferably, in the fiber-reinforced polyamide resin base material of the present invention, the end-modified polyamide resin contains a total of 50 to 150 [mol/t] of amino end groups and carboxyl end groups, and the ratio between the content [mol/t] of the amino end groups and the content [mol/t] of the carboxyl end groups (amino end groups/carboxyl end groups) is 0.5 to 2.5.

Preferably, in the fiber-reinforced polyamide resin base material of the present invention, the relative viscosity ($\eta_r$) of a solution of the end-modified polyamide resin at a resin concentration of 0.01 g/mL in 98% sulfuric acid at 25° C. is 1.3 to 3.0.

Preferably, in the fiber-reinforced polyamide resin base material of the present invention, the weight average molecular weight Mw of the end-modified polyamide resin as measured by gel permeation chromatography is 15,000 to 50,000.

Preferably, in the fiber-reinforced polyamide resin base material of the present invention, the melt viscosity of the end-modified polyamide resin at the melting point+60° C. at a shear rate of 9728 sec$^{-1}$ is not more than 30 Pa·s.

Preferably, in the fiber-reinforced polyamide resin base material of the present invention, the content retention rate of the end structure represented by General Formula (I) of the end-modified polyamide resin after 60 minutes of retention at the melting point+60° C. ((content after retention/content before retention)×100) is not less than 80%.

Preferably, in the fiber-reinforced polyamide resin base material of the present invention, the weight average molecular weight retention rate of the end-modified polyamide resin after 60 minutes of retention at the melting point+60° C. ((weight average molecular weight after retention/weight average molecular weight before retention)×100) is 80% to 120%.

Preferably, in the fiber-reinforced polyamide resin base material of the present invention, the melt viscosity retention rate of the end-modified polyamide resin after 60 minutes of retention at the melting point+60° C. ((melt viscosity after retention/melt viscosity before retention)×100) is 80% to 120%.

Preferably, in the fiber-reinforced polyamide resin base material of the present invention, the weight reduction rate of the end-modified polyamide resin after 40 minutes of retention under a nitrogen atmosphere at the melting point+60° C. is not more than 4%.

By the present invention, a fiber-reinforced polyamide resin base material having an excellent impregnation property and thermal stability, less void, and excellent surface quality can be obtained. In embodiments of the present invention, the fiber-reinforced polyamide resin base material may be molded into a desired shape by an arbitrary molding method such as autoclave molding, press molding, or film molding. Molded articles obtained by molding of the fiber-reinforced polyamide resin base material may be effectively processed into, for example, peripheral parts for aircraft engines; interior parts for aircrafts; exterior parts for aircrafts; vehicle skeletons; automobile parts such as peripheral parts for automobile engines, automobile underhood parts, automobile gear parts, automobile interior parts, automobile exterior parts, intake/exhaust system parts, engine coolant system parts, and automobile electrical equipment parts; and electric or electronic parts such as LED reflectors and SMT connectors.

DETAILED DESCRIPTION OF EMBODIMENTS OF THE INVENTION

Embodiments of the present invention are described below in detail. In embodiments of the present invention, the fiber-reinforced polyamide resin base material has one of the two modes described below. The first mode is a fiber-reinforced polyamide resin base material comprising continuous reinforcing fibers impregnated with the later-mentioned end-modified polyamide resin, and the second mode is a fiber-reinforced polyamide resin base material comprising a reinforcing fiber base material in which discontinuous-fiber reinforcing fibers are dispersed, impregnated with the later-mentioned end-modified polyamide resin.

In embodiments of the present invention, the "continuous reinforcing fibers" in the first mode means reinforcing fibers without breakage in the fiber-reinforced polyamide resin base material. Examples of the form and the alignment of the reinforcing fibers in embodiments of the present invention include those aligned in one direction, woven fabrics (cloths), knit fabrics, braids, and tows. In particular from the viewpoint of efficient improvement of mechanical characteristics in a particular direction, the reinforcing fibers are preferably aligned in one direction.

The "reinforcing fiber base material in which discontinuous fibers are dispersed" in the second mode means a mat-shaped fiber-reinforced polyamide resin base material in which the reinforcing fibers are cut and dispersed. The reinforcing fiber base material in embodiments of the present invention may be obtained by an arbitrary method such as a wet method in which fibers are dispersed in a solution and then formed into a sheet shape, and a dry method in which a carding machine or an air-laid machine is used. From the viewpoint of productivity, a dry method using a carding machine or an air-laid machine is preferred.

The number average fiber length of the discontinuous fibers in the reinforcing fiber base material in embodiments of the present invention is preferably 3 to 100 mm. In cases where the number average fiber length of the discontinuous fibers is not less than 3 mm, the reinforcement effect by the discontinuous fibers can be sufficiently exerted, and the resulting fiber-reinforced polyamide resin base material can have improved mechanical strength. The number average fiber length is preferably not less than 5 mm. On the other hand, in cases where the number average fiber length of the discontinuous fibers is not more than 100 mm, fluidity during the molding can be improved. The number average fiber length of the discontinuous fibers is more preferably not more than 50 mm, still more preferably not more than 30 mm.

The number average fiber length of the discontinuous fibers in the fiber-reinforced polyamide resin base material in embodiments of the present invention can be determined by the following method. First, from the fiber-reinforced polyamide resin base material, a sample of 100 mm×100 mm is excised, and the excised sample is heated in an electric furnace at 600° C. for 1.5 hours to burn out the matrix resin. From the thus obtained fiber-reinforced polyamide resin base material, 400 discontinuous reinforcing fiber bundles are arbitrarily collected. By measurement of the fiber lengths of the collected discontinuous reinforcing fiber bundles in millimeter units using a caliper, the number average fiber length (Ln) can be calculated according to the following equation.

$$Ln = \Sigma Li/400$$

(Li: measured fiber length (i=1, 2, 3, . . . , 400) (unit: mm))

The number average fiber length of the discontinuous fibers can be adjusted to the range described above by cutting the fibers to a desired length in the production of the reinforcing fiber base material. The orientation of fibers in the discontinuous-fiber mat is not limited and, from the viewpoint of moldability, the fibers are preferably isotropically dispersed.

The type of the reinforcing fibers in the first and second modes is not limited, and examples of the reinforcing fibers include carbon fibers, metal fibers, organic fibers, and inorganic fibers. Two or more of these may be used.

Examples of the carbon fibers include PAN-based carbon fibers, which are produced using polyacrylonitrile (PAN) fibers as a raw material; pitch-based carbon fibers, which are produced using petroleum tar or petroleum pitch as a raw material; cellulose-based carbon fibers, which are produced using viscous rayon or cellulose acetate as a raw material; vapor-grown carbon fibers, which are produced using a hydrocarbon or the like as a raw material; and graphitized fibers thereof. Among these carbon fibers, PAN-based carbon fibers are preferably used since they have excellent balances between the strength and the elastic modulus.

Examples of the metal fibers include fibers composed of a metal such as iron, gold, silver, copper, aluminum, brass, or stainless steel.

Examples of the organic fibers include fibers composed of an organic material such as aramid, polybenzoxazole (PBO), polyphenylene sulfide, polyester, polyamide, or polyethylene. Examples of the aramid fibers include para-based aramid fibers, which have excellent strength and elastic moduli, and meta-based aramid fibers, which have excellent fire retardancy and long-term heat resistance. Examples of the para-based aramid fibers include polyparaphenylene terephthalamide fibers and copolyparaphenylene-3,4'-oxydiphenylene terephthalamide fibers. Examples of the meta-based aramid fibers include polymetaphenylene isophthalamide fibers. As aramid fibers, para-based aramid fibers are preferably used since they have higher elastic moduli than meta-based aramid fibers.

Examples of the inorganic fibers include fibers composed of an inorganic material such as glass, basalt, silicon carbide, or silicon nitride. Examples of the glass fibers include E-glass fibers (for electrical purposes), C-glass fibers (for corrosion resistance), S-glass fibers, and T-glass fibers (high strength and high elastic modulus). Basalt fibers are prepared by forming a mineral basalt into fibers, and have very high heat resistance. In general, basalt contains an iron compound FeO or $FeO_2$ at 9 to 25% by weight, and a titanium compound TiO or $TiO_2$ at 1 to 6% by weight. However, basalt can be formed into fibers after increasing these components in a molten state.

Since the fiber-reinforced polyamide resin base materials in the first and second modes of the present invention are often expected to play a role as reinforcing materials, they preferably exert good mechanical characteristics. For the exertion of the high mechanical characteristics, the reinforcing fibers preferably contain carbon fibers.

In the fiber-reinforced polyamide resin base materials in the first and second modes of the present invention, each reinforcing fiber is usually constituted by a single reinforcing fiber bundle, or a plurality of reinforcing fiber bundles aligned, wherein each bundle contains a large number of monofilaments. In the single reinforcing fiber bundle, or the plurality of reinforcing fiber bundles aligned, the total filament number (number of monofilaments) in the reinforcing fiber is preferably 1000 to 2,000,000. From the viewpoint of productivity, the total filament number in the reinforcing fiber is more preferably 1000 to 1,000,000, still more preferably 1000 to 600,000, especially preferably 1000 to 300,000. The upper limit of the total filament number in the reinforcing fiber is not limited as long as the balance with dispersibility and ease of handling is also taken into account to allow maintenance of favorable productivity, dispersibility, and ease of handling.

Each reinforcing fiber bundle in the first and second modes of the present invention is preferably constituted by bundling of 1000 to 50,000 reinforcing fiber monofilaments having an average diameter of 5 to 10 μm.

The fiber-reinforced polyamide resin base material in the first mode of the present invention is characterized in that the polyamide resin for impregnation of the continuous reinforcing fibers is an end-modified polyamide resin. The fiber-reinforced polyamide resin base material in the second mode of the present invention is characterized in that the polyamide resin for impregnation of the reinforcing fiber base material in which discontinuous-fiber reinforcing fibers are dispersed is an end-modified polyamide resin. The "end-modified polyamide resin" in the present invention means a polyamide resin in which at least part of the polymer constituting the polyamide resin has, at an end group of the polymer, a structure (which may be hereinafter referred to as modified structure) constituted by a structural unit different from a repeating structural unit constituting the backbone of the polymer. Since the at least part of the polymer constituting the polyamide resin contains a modified structure at an end group of the polymer, the melt viscosity of the polyamide resin can be reduced while maintaining mechanical characteristics such as the tensile strength and the impact resistance. Thus, an improved impregnation property can be achieved even at a rather low processing temperature, and therefore generation of void in the fiber-reinforced polyamide resin base material can be largely suppressed. This is thought to be due to the phenomenon that, since the at least part of the polymer constituting the polyamide resin has the modified structure at an end group of the polymer, effects such as a reduction in the intermolecular interaction between polymer chains and an increase in the free volume are produced, leading to a significant increase in the molecular mobility of the polymer chains.

In embodiments of the present invention, the end-modified polyamide resin is a polyamide resin that can be obtained using as a main raw material(s) one or more selected from amino acid, lactam, and a "mixture of diamine and dicarboxylic acid", wherein at least part of the polymer constituting the polyamide resin contains a modified structure at an end group of the polymer. In other words, the end-modified polyamide resin in the present invention is a polyamide resin polymerized using as a main raw material(s) at least one selected from the group consisting of a combination of diamine and dicarboxylic acid; amino acid; and lactam; wherein at least part of the polymer constituting the polyamide resin contains a modified structure at an end group of the polymer. In cases where amino acid or lactam is used as a raw material, the chemical structure constituting the main structural unit of the polyamide resin preferably has a carbon number within the range of 4 to 20. In cases where diamine and dicarboxylic acid are used as raw materials, the diamine preferably has a carbon number within the range of 2 to 20, and the dicarboxylic acid preferably has a carbon number within the range of 2 to 20. Representative examples of the raw materials include the following.

Specific examples of the raw materials include:

amino acids such as 6-aminocaproic acid, 11-aminoundecanoic acid, 12-aminododecanoic acid, and para-aminomethylbenzoic acid;

lactams such as ε-caprolactam, w-undecanelactam, and w-laurolactam;

diamines such as aliphatic diamines including ethylenediamine, trimethylenediamine, tetramethylenediamine, pentamethylenediamine, hexamethylenediamine, heptamethylenediamine, octamethylenediamine, nonamethylenediamine, decanediamine, undecanediamine, dodecanediamine, tridecanediamine, tetradecanediamine, pentadecanediamine, hexadecanediamine, heptadecanediamine, octadecanediamine, nonadecanediamine, eicosanediamine, 2-methyl-1,5-diaminopentane, and 2-methyl-1,8-diaminooctane; alicyclic diamines including cyclohexanediamine, bis-(4-aminocyclohexyl)methane, and bis(3-methyl-4-aminocyclohexyl)methane; and aromatic diamines including xylylenediamine; and aliphatic dicarboxylic acids such as oxalic acid, malonic acid, succinic acid, glutaric acid, adipic acid, suberic acid, azelaic acid, sebacic acid, undecanedioic acid, and dodecanedioic acid; aromatic dicarboxylic acids such as terephthalic acid, isophthalic acid, 2-chloroterephthalic acid, 2-methylterephthalic acid, 5-methylisophthalic acid, 5-sodium sulfoisophthalic acid, hexahydroterephthalic acid, and hexahydroisophthalic acid; alicyclic dicarboxylic acids such as cyclohexanedicarboxylic acid; and dialkyl esters and dichlorides of these dicarboxylic acids.

In embodiments of the present invention, polyamide homopolymers and copolymers induced from these raw materials may be used as the polyamide resin to which the end structure is to be introduced. The polyamide resin may be formed with a mixture of two or more of these polyamides. In embodiments of the present invention, from the viewpoint of improving mechanical characteristics and thermal stability during melt retention to reduce void formed by a generated gas, the structural units derived from the raw materials exemplified above are contained in an amount of preferably not less than 80 mol %, more preferably not less than 90 mol %, still more preferably 100 mol % with respect to 100 mol % of the total structural units constituting the polyamide resin excluding the modified structure. The polymerized structure derived from the raw materials exemplified above is preferably linear.

The melting point (Tm) of the end-modified polyamide resin in embodiments of the present invention is preferably not less than 200° C. The melting point of the end-modified polyamide resin herein can be determined by differential scanning calorimetry (DSC). The measurement method is as follows. The end-modified polyamide resin is weighed and taken in an amount of 5 to 7 mg. Under a nitrogen atmosphere, the resin is heated from 20° C. to Tm+30° C. at a heating rate of 20° C./min. Subsequently, the resin is cooled to 20° C. at a cooling rate of 20° C./min. The temperature is then increased again from 20° C. to Tm+30° C. at a heating rate of 20° C./min., and the temperature at the top of the endothermic peak that appears in this process is defined as the melting point (Tm).

Examples of the end-modified polyamide resin having a melting point of not less than 200° C. include resins wherein the following polyamides and copolymers thereof contain a modified structure at an end. Two or more of these may be used depending on required properties such as the heat resistance, toughness, and surface properties. Examples of the polyamides include polycaproamide (polyamide 6), polyundecanamide (polyamide 11), polydodecanamide (polyamide 12), polyhexamethylene adipamide (polyamide 66), polytetramethylene adipamide (polyamide 46), polypentamethylene adipamide (polyamide 56), polytetramethylene sebacamide (polyamide 410), polypentamethylene sebacamide (polyamide 510), polyhexamethylene sebacamide (polyamide 610), polyhexamethylene dodecamide (polyamide 612), polydecamethylene sebacamide (nylon 1010), polydecamethylene dodecamide (nylon 1012), polymetaxylylene adipamide (MXD6), polymetaxylylene sebacamide (MXD10), polyparaxylylene sebacamide (PXD10), polynonamethylene terephthalamide (nylon 9T), polydecamethylene terephthalamide (polyamide 10T), polyundecamethylene terephthalamide (polyamide 11T), polydodecamethylene terephthalamide (polyamide 12T), polypentamethylene terephthalamide/polyhexamethylene terephthalamide copolymer (polyamide 5T/6T), poly-2-methylpentamethylene terephthalamide/polyhexamethylene terephthalamide (polyamide M5T/6T), polyhexamethylene adipamide/polyhexamethylene terephthalamide copolymer (polyamide 66/6T), polyhexamethylene adipamide/polyhexamethylene isophthalamide copolymer (polyamide 66/6I), polyhexamethylene adipamide/polyhexamethylene terephthalamide/polyhexamethylene isophthalamide (polyamide 66/6T/6I), polybis(3-methyl-4-aminocyclohexyl)methane terephthalamide (polyamide MACMT), polybis(3-methyl-4-aminocyclohexyl)methane isophthalamide (polyamide MACMI), polybis(3-methyl-4-aminocyclohexyl)methane dodecamide (polyamide MACM12), polybis(4-aminocyclohexyl)methane terephthalamide (polyamide PACMT), polybis(4-aminocyclohexyl)methane isophthalamide (polyamide PACMI), and polybis(4-aminocyclohexyl)methane dodecamide (polyamide PACM12).

Especially preferred examples of the polyamides include those wherein polyamide 6, polyamide 66, polyamide 56, polyamide 410, polyamide 510, polyamide 610, polyamide 6/66, polyamide 6/12, polyamide 9T, polyamide 10T, or the like contains a modified structure at its end.

In embodiments of the present invention, the modified structure contained at the end group of the end-modified polyamide is different from a structure derived from a repeating structural unit constituting the backbone of the polymer of the polyamide resin. Examples of the modified structure include structures derived from a saturated aliphatic compound, unsaturated aliphatic compound, or aromatic compound. Two or more of these may be used. From the viewpoint of improving the impregnation property and the surface quality, the structure is preferably a structure derived from a saturated aliphatic compound or an aromatic compound, more preferably a structure derived from a saturated aliphatic compound.

Examples of the modified structure in embodiments of the present invention include the residues of the later-mentioned terminal modification agents.

The end-modified polyamide resin in embodiments of the present invention preferably has an end structure represented by the following General Formula (I). Since the end structure represented by the following General Formula (I) has an alkylene oxide structure, the polymer obtained has high molecular mobility and excellent affinity to amide groups. Intercalation, between polyamide molecular chains, of the structure represented by the following General Formula (I) present at the end of the polyamide resin causes an increase in the free volume of the polymer, leading to a decrease in entanglement. As a result, molecular mobility of the polymer further increases to allow reduction of the melt viscosity and improvement of the impregnation property and the surface quality. Such effects are extremely high compared to cases where a polyalkylene oxide structure is mainly contained in the backbone of the polyamide resin.

$$—X—(R^1—O)_m—R^2 \quad \text{(I)}$$

In the General Formula (I), m represents a range of 2 to 100 (not less than 2 and not more than 100). As m increases, the melt viscosity-reducing effect can be more effectively exerted. m is preferably not less than 5, more preferably not less than 8, still more preferably not less than 16. On the other hand, as m decreases, heat resistance can be kept higher. m is preferably not more than 70, more preferably not more than 50. From the viewpoint of maintaining properties derived from the main structural unit of the polyamide resin, the end-modified polyamide resin in the present invention preferably contains the structure represented by the General Formula (I) only at an end(s) of the polymer.

In the General Formula (I), $R^1$ represents a $C_2$-$C_{10}$ (having a carbon number of not less than 2 and not more than 10) divalent hydrocarbon group. From the viewpoint of affinity to the main structural unit of the polyamide resin, a $C_2$-$C_6$ hydrocarbon group is more preferred, and a $C_2$-$C_4$ hydrocarbon group is more preferred.

From the viewpoint of thermal stability and discoloration prevention of the end-modified polyamide resin, a saturated hydrocarbon group is still more preferred. Examples of $R^1$ include an ethylene group, 1,3-trimethylene group, isopropylene group, 1,4-tetramethylene group, 1,5-pentamethylene group, and 1,6-hexamethylene group. The $R^1$ of m-pieces may be a combination of hydrocarbon groups having different carbon numbers. The $R^1$'s are preferably constituted by at least a $C_2$ divalent saturated hydrocarbon group and a $C_3$ divalent saturated hydrocarbon group. The $R^1$'s are more preferably constituted by an ethylene group(s), which has/have excellent affinity to the main structural unit of the polyamide resin, and an isopropylene group(s), which has/have a large free volume. By this, the melt viscosity-reducing effect can be more effectively produced. In this case, the end structure represented by General Formula (I) preferably contains not less than 10 ethylene groups and not more than 6 isopropylene groups. By this, end structures in an amount close to a desired amount can be introduced to the polyamide resin, and the melt viscosity-reducing effect can be further increased. $R^2$ represents a $C_1$-$C_{30}$ (having a carbon number of not less than 1 and not more than 30) monovalent hydrocarbon group. The smaller the carbon number of $R^2$, the higher the affinity to the main structural unit of the polyamide resin. Therefore, a $C_1$-$C_{20}$ hydrocarbon group is preferred, and a $C_1$-$C_{10}$ hydrocarbon group is more preferably used. In a still more preferred mode, from the viewpoint of thermal stability and discoloration prevention of the end-modified polyamide resin, $R^2$ is a monovalent saturated hydrocarbon group. Examples of $R^2$ include a methyl group, ethyl group, propyl group, butyl group, pentyl group, hexyl group, heptyl group, octyl group, nonyl group, and decyl group. Among these, a methyl group and an ethyl group are more preferred since these have excellent affinity to the main structural unit of the polyamide resin.

In the General Formula (I), —X— represents —NH—, —N(CH$_3$)—, or —(C=O)—. Among these, —NH— is more preferred since it has high affinity to the main structural unit of the polyamide resin.

The end-modified polyamide resin in embodiments of the present invention preferably has the end structure represented by General Formula (I) in at least part of the end groups of the polymer constituting the end-modified polyamide resin. In other words, the end-modified polyamide resin in the present invention preferably has the end structure represented by General Formula (I) at at least one end of the polymer constituting the end-modified polyamide resin.

The end-modified polyamide resin in embodiments of the present invention preferably has the end structure represented by General Formula (I) in an amount of 1 to 20% by mass (not less than 1% by mass and not more than 20% by mass) with respect to 100% by mass of the end-modified polyamide resin. In cases where the content of the end structure represented by General Formula (I) is not less than 1% by mass, the melt viscosity of the end-modified polyamide resin can be reduced; the impregnation property and the surface quality can be improved; and the void can be reduced. The content of the end structure represented by General Formula (I) is more preferably not less than 3% by mass, still more preferably not less than 5% by mass. On the other hand, in cases where the content of the end structure represented by General Formula (I) is not more than 20% by mass, an increase in the gas component caused by thermal decomposition of the structure represented by General Formula (I) during the melt retention can be suppressed; thermal stability during the melt retention can be improved; the void due to the generated gas can be reduced; and the surface quality can be improved. Further, since the molecular weight of the end-modified polyamide resin can be increased, the mechanical characteristics can be improved. The content of the end structure represented by General Formula (I) is more preferably not more than 15% by mass, still more preferably not more than 10% by mass.

In embodiments of the present invention, the content of the end structure represented by General Formula (I) in the end-modified polyamide resin can be adjusted to a desired range by, for example, adjusting the amount of the later-mentioned terminal modification agent represented by General Formula (III) to be added for the production of the end-modified polyamide resin.

The end-modified polyamide resin in embodiments of the present invention preferably further has an end structure represented by the following General Formula (II). As described above, by the introduction of the end structure represented by General Formula (I), the melt viscosity of the end-modified polyamide resin can be reduced, and the impregnation property and the surface quality can be improved. However, during a long period of melt retention such as during impregnation, the end structure represented by General Formula (I) tends to undergo thermal decomposition. In particular, since amino end groups and carboxyl end groups of the polyamide resin act as a catalyst of thermal decomposition of the end structure represented by General Formula (I), reduction of the amount of amino end groups and carboxyl end groups in the polyamide resin enables suppression of thermal decomposition of the end structure represented by General Formula (I), and enables improvement of thermal stability during the melt retention while maintaining the melt viscosity-reducing effect of the end structure represented by General Formula (I). Thus, the impregnation property and the surface quality can be improved, and the void can be reduced. For example, in comparison to cases where the end structure represented by General Formula (I) is simply introduced to the carboxyl end group of the polyamide resin by reaction with the terminal modification agent represented by the later-mentioned General Formula (III), further introduction of the end structure represented by the following General Formula (II) to the amino end group enables suppression of thermal decomposition of the structure represented by General Formula (I), enables improvement of thermal stability during the melt retention while maintaining the melt viscosity-reducing effect, and enables reduction of the void and improvement of the surface quality.

A more concrete description is given below. For example, by reacting the terminal modification agent represented by the later-mentioned General Formula (III) with the carboxyl end group of the polyamide resin, a polyamide resin having only the end structure represented by General Formula (I) can be obtained. However, although one end of the polyamide resin is modified with the end structure represented by General Formula (I), the other end is unmodified, and remains as an amino end group or a carboxyl group. Thus, the amino end group or the carboxyl end group acts as a catalyst of thermal decomposition of the end structure represented by General Formula (I), and this promotes thermal decomposition of the structure represented by General Formula (I). Therefore, by, for example, further reacting the terminal modification agent represented by the later-mentioned General Formula (IV) with the above polyamide resin (that is, the polyamide resin in which only one end is modified with the structure represented by General Formula (I)), the other end can be modified to obtain a polyamide resin further having the end structure represented by the following General Formula (II). By the introduction of the end structure represented by General Formula (II) to the polyamide resin modified with the structure represented by General Formula (I), the above-described effects can be exerted.

—Y—R³ (II)

In the General Formula (II), $R^3$ represents a $C_1$-$C_{30}$ (having a carbon number of not less than 1 and not more than 30) monovalent hydrocarbon group. The smaller the carbon number of $R^3$, the higher the affinity to the main structural unit of the polyamide resin. Therefore, a $C_1$-$C_{30}$ hydrocarbon group is preferred. Specific examples of $R^3$ include linear alkyl groups such as methyl, ethyl, propyl, butyl, pentyl, hexyl, heptyl, octyl, nonyl, decyl, undecyl, tridecyl, tetradecyl, pentadecyl, hexadecyl, heptadecyl, octadecyl, nonadecyl, icosyl, eicosyl, henicosyl, heneicosyl, docosyl, tricosyl, tetracosyl, pentacosyl, hexacosyl, heptacosyl, octacosyl, nonacosyl, and triacontyl; branched alkyl groups such as isopropyl, isobutyl, tert-butyl, isopentyl, and neopentyl; cycloalkyl groups such as cyclopentyl, cyclohexyl, and cycloheptyl; aryl groups such as phenyl and tolyl; and aralkyl groups such as benzyl and 2-phenylethyl. In a more preferred mode, from the viewpoint of thermal stability and discoloration prevention of the end-modified polyamide resin, $R^3$ is a monovalent saturated hydrocarbon group having a carbon number of not less than 1 and not more than 20, or an aryl group.

In cases where X in the General Formula (I) is —NH— or —N(CH₃)—, —Y— in the General Formula (II) represents —(C=O)—, and in cases where X in the General Formula (I) is —(C=O)—, Y in the General Formula (II) represents —NH— or —N(CH₃)—.

Normally, in a polyamide resin whose both ends are unmodified, one end groups is an amino end group, and the other end group is a carboxyl end group. Here, in a case where the terminal modification agent represented by General Formula (III) has an amino end group, such a terminal modification agent reacts with the carboxyl end group of the polyamide resin, and X in General Formula (I) is —NH— or —N(CH₃)—. In this case, by reacting the amino end group as the other end of the polyamide resin with the terminal modification agent represented by General Formula (IV), this other end of the polyamide resin can be blocked with the end structure of the General Formula (II). In this case, Y in the General Formula (II) is —(C=O)—. On the other hand, in a case where the terminal modification agent represented by General Formula (III) has a carboxyl end group, such a terminal modification agent reacts with the amino end group of the polyamide resin, and X in General Formula (I) is —(C=O)—. In this case, by reacting the carboxyl end group as the other end of the polyamide resin with the terminal modification agent represented by General Formula (IV), this other end of the polyamide resin is blocked with the end structure of the General Formula (II), and Y in General Formula (II) is —NH— or —N(CH₃)—.

The end-modified polyamide resin in the present invention preferably has the end structure represented by General Formula (II) in an amount of 0.1 to 5% by mass (not less than 0.1% by mass and not more than 5% by mass) with respect to 100% by mass of the end-modified polyamide resin. In cases where the content of the end structure represented by General Formula (II) is not less than 0.1% by mass, thermal decomposition of the structure represented by General Formula (I) in the end-modified polyamide resin during the melt retention can be suppressed; thermal stability during the melt retention can be improved; the void can be reduced; and the surface quality can be improved. The content of the end structure represented by General Formula (II) is more preferably not less than 0.2% by mass, still more preferably not less than 0.4% by mass. On the other hand, in cases where the content of the end structure represented by General Formula (II) is not more than 5% by mass, mechanical characteristics and thermal stability during the melt retention can be improved; the void can be reduced; and the surface quality can be improved. The content of the end structure represented by General Formula (II) is more preferably not more than 3% by mass, still more preferably not more than 1% by mass.

In the present invention, the content of the end structure represented by General Formula (II) in the end-modified polyamide resin can be adjusted to a desired range by, for example, adjusting the amount of the later-mentioned terminal modification agent represented by General Formula (IV) to be added for the production of the end-modified polyamide resin.

The end-modified polyamide resin in the present invention preferably contains a polyamide resin having an end structure represented by General Formula (I) and an end structure represented by General Formula (II) (that is, a polyamide resin in which one end is modified with an end structure represented by General Formula (I), and the other end is modified with an end structure represented by General Formula (II)). In another mode, the end-modified polyamide resin in the present invention may contain a polyamide resin having only an end structure represented by General Formula (I) (for example, a polyamide resin in which one end is modified with an end structure represented by General Formula (I), but the other end is unmodified) and a polyamide resin having only an end structure represented by General Formula (II) (for example, a polyamide resin in which one end is modified with an end structure represented by General Formula (II), but the other end is unmodified).

In the end-modified polyamide resin in the present invention, the total of the content [mol/t] of the end structure represented by General Formula (I) and the content of the end structure represented by General Formula (II) is preferably 60 to 250 mol/t (not less than 60 mol/t and not more than 250 mol/t). By the inclusion of the end structure represented by General Formula (I) and the end structure represented by General Formula (II) in a total amount of not less than 60 mol per 1 t of the end-modified polyamide resin, the melt viscosity of the end-modified polyamide resin can be reduced to improve the impregnation property; thermal stability during the melt retention can be improved; the void can be reduced; and the surface quality can be improved. The total content of these end structures is more preferably not less than 70 mol/t, still more preferably not less than 80 mol/ton. On the other hand, in cases where the total content of the end structure represented by General Formula (I) and the end structure represented by General Formula (II) in 1 t of the end-modified polyamide resin is not more than 250 mol, mechanical characteristics and thermal stability during the melt retention can be improved; the void can be reduced; and the surface quality can be improved. The total content of these end structures is more preferably not more than 225 mol/t, still more preferably not more than 200 mol/ton.

In the present invention, the total amount of the end structure represented by General Formula (I) and the end structure represented by General Formula (II) in the end-modified polyamide resin can be adjusted to a desired range by, for example, adjusting the amount of the later-mentioned terminal modification agent represented by General Formula (III) and the amount of the terminal modification agent represented by General Formula (IV) to be added for the production of the end-modified polyamide resin.

In the end-modified polyamide resin in the present invention, the ratio of the content [mol/t] of the end structure represented by General Formula (I) to the content [mol/t] of the end structure represented by General Formula (II) ((I)/(II)) is preferably 0.3 to 2.5. During the melt retention of the polyamide resin, an increase in the molecular weight occurs due to polymerization reaction between amino end groups and carboxyl end groups while a decrease in the molecular weight occurs due to thermal decomposition. As the molar ratio ((I)/(II)) departs further from 1, the difference between the amounts of modified (blocked) amino end groups and carboxyl end groups increases. As the difference increases, the polymerization reaction during the melt retention becomes less likely to proceed, and the decrease in the molecular weight due to thermal decomposition becomes predominant. This tends to result in larger decreases in the melt viscosity and the molecular weight during the melt retention. Moreover, as the difference increases, the polymerization reaction becomes less likely to proceed during the melt retention, so that consumption of end groups (amino end groups and carboxyl end groups) in the polymerization reaction decreases. Therefore, as described above, these end groups act as a catalyst of thermal decomposition of the end structure represented by General Formula (I), and promote thermal decomposition of the alkylene oxide structure in the end structure represented by General Formula (I), which tends to result in an increased melt viscosity. By setting the molar ratio ((I)/(II)) to not less than 0.3, the melt viscosity of the end-modified polyamide resin can be reduced to improve the impregnation property; thermal decomposition of the structure represented by General Formula (I) in the end-modified polyamide resin during the melt retention can be suppressed; the thermal stability can be improved; the void can be reduced; and the surface quality can be improved. The molar ratio ((I)/(II)) is more preferably not less than 0.5, preferably not less than 0.6, most preferably not less than 0.8. On the other hand, by setting the molar ratio ((I)/(II)) to not more than 2.5, thermal decomposition of the end structure represented by General Formula (I) in the end-modified polyamide resin during the melt retention can be suppressed; the thermal stability can be improved; the void due to the generated gas can be reduced; and the surface quality can be improved. The molar ratio ((I)/(II)) is more preferably not more than 2.2, still more preferably not more than 2.0.

Here, the contents of the end structure represented by General Formula (I) and the end structure represented by General Formula (II) in the end-modified polyamide resin can be determined by $^1$H-NMR measurement. The measurement method and the calculation method are as follows.

First, a solution of the polyamide resin at a concentration of 50 mg/mL in deuterated sulfuric acid is prepared, and $^1$H-NMR measurement is carried out with a number of scans of 256. From the spectrum integrated value of $R^1$, the spectrum integrated value of $R^2$, the spectrum integrated value of $R^3$, and the spectrum integrated value of the repeating structural unit of the polyamide resin skeleton (repeating structural unit constituting the backbone of the polymer), the content of each end structure (% by mass or mol/t) and the ratio of the content (mol/t) of the end structure (I) to the content (mol/t) of the end structure (II) (which may be hereinafter referred to as "molar ratio") can be calculated.

In the present invention, the above molar ratio ((I)/(II)) in the end-modified polyamide resin can be adjusted to a desired range by, for example, adjusting the ratio between the amount of the later-mentioned terminal modification agent represented by General Formula (III) and the amount of the terminal modification agent represented by General Formula (IV) to be added for the production of the end-modified polyamide resin.

The end-modified polyamide resin in the present invention preferably contains a total of 50 to 150 mol/t (not less than 50 mol/t and not more than 150 mol/t) of amino end groups and carboxyl end groups. By the inclusion of these end groups in a total amount of not less than 50 mol per 1 t of the end-modified polyamide resin, a decrease in the molecular weight retention rate during the melt retention can be suppressed; the thermal stability can be improved; the void due to the generated gas can be reduced; and the surface quality can be improved. The total content of these end groups is more preferably not less than 60 mol/t, still more preferably not less than 80 mol/ton. On the other hand, by the inclusion of amino end groups and carboxyl end groups in a total amount of not more than 150 mol/t in the end-modified polyamide resin, thermal decomposition of the structure represented by General Formula (I) in the end-modified polyamide resin and an increase in the molecular weight can be suppressed during the melt retention; the thermal stability can be improved; the void can be suppressed; and the surface quality can be improved. The total content of these end groups is more preferably not more than 135 mol/t, still more preferably not more than 120 mol/ton.

Preferably in the end-modified polyamide resin in the present invention, the ratio between the content [mol/t] of amino end groups and the content [mol/t] of carboxyl end groups (content of amino end groups/content of carboxyl end groups) is preferably 0.5 to 2.5 (not less than 0.5 and not more than 2.5). As described above, as the difference between the amount of amino end groups and the amount of carboxyl end groups increases, the polymerization during the melt retention becomes less likely to proceed, and the decrease in the molecular weight due to thermal decomposition becomes predominant. This tends to result in larger decreases in the melt viscosity and the molecular weight during the melt retention. Moreover, since the polymerization is less likely to proceed during the melt retention, consumption of end groups (amino end groups and carboxyl end groups) in the polymerization reaction decreases. Therefore, as described above, these end groups act as a catalyst of thermal decomposition of General Formula (I), and promote thermal decomposition of the alkylene oxide structure in the end structure represented by General Formula (I), which tends to result in a larger melt viscosity. By setting the molar ratio (content of amino end groups/content of carboxyl end groups) to not less than 0.5, thermal decomposition of the structure represented by General Formula (I) in the end-modified polyamide resin and an increase in the molecular weight can be suppressed during the melt retention; the thermal stability and the impregnation property can be improved; the void can be reduced; and the surface quality can be improved. The molar ratio (amino end groups/carboxyl end groups) is more preferably not less than 0.6, still more preferably not less than 0.8. On the other hand, by setting the molar ratio (amino end groups/carboxyl end groups) to not more than 2.5, thermal decomposition of the structure represented by General Formula (I) in the end-modified polyamide resin can be suppressed during the melt retention; the thermal stability can be improved; the void in the base material due to the generated gas can be reduced; and the surface quality can be improved. The molar ratio (content of amino end groups/content of carboxyl end groups) is more preferably not more than 2.4, still more preferably not more than 2.3.

Here, the content of amino end groups in the end-modified polyamide resin can be measured by dissolving the end-modified polyamide resin in a phenol/ethanol mixed solution (weight ratio: 83.5/16.5), and then performing titration with an aqueous hydrochloric acid solution using thymol blue as an indicator. The content of carboxyl end groups in the end-modified polyamide resin can be measured by dissolving the end-modified polyamide resin in benzyl alcohol at 195° C., and then performing titration with a solution of potassium hydroxide in ethanol using phenolphthalein as an indicator.

In the present invention, the ratio between the content of amino end groups and the content of carboxyl end groups in the end-modified polyamide resin can be adjusted to a desired range by, for example, adjusting the ratio between the amount of the later-mentioned teniinal modification agent represented by General Formula (III) and the amount of the terminal modification agent represented by General Formula (IV) to be added for the production of the end-modified polyamide resin, and/or the reaction time.

Preferably, the relative viscosity ($\eta_r$) of a solution of the end-modified polyamide resin in the present invention at a resin concentration of 0.01 g/mL in 98% sulfuric acid at 25° C. is preferably within the range of 1.3 to 3.0 (not less than 1.3 and not more than 3.0). By setting $\eta_r$ to not less than 1.3, toughness can be improved, and mechanical characteristics of the base material can be improved. $\eta_r$ is preferably not less than 1.4, more preferably not less than 1.5. On the other hand, by setting fir to not more than 3.0, the impregnation property can be improved. $\eta_r$ is preferably not more than 2.5, more preferably not more than 2.1. $\eta_r$ is still more preferably not more than 2.05, most preferably not more than 2.0.

In the present invention, the relative viscosity of the end-modified polyamide resin can be adjusted to a desired range by, for example, adjusting the amounts of the later-mentioned terminal modification agent represented by General Formula (III) and the terminal modification agent represented by General Formula (IV) to be added for the production of the end-modified polyamide resin, and/or the reaction time.

The weight average molecular weight (Mw) of the end-modified polyamide resin in the present invention as measured by gel permeation chromatography (GPC) is preferably not less than 15,000. By setting Mw to not less than 15,000, mechanical characteristics can be improved. Mw is more preferably not less than 18,000, still more preferably not less than 20,000. On the other hand, Mw is preferably not more than 50,000. By setting Mw to not more than 50,000, the melt viscosity can be reduced, and the impregnation property can be improved. Mw is more preferably not more than 45,000, still more preferably not more than 40,000. The weight average molecular weight (Mw) in the present invention is obtained by performing GPC measurement at 30° C. using hexafluoroisopropanol (supplemented with 0.005 N sodium trifluoroacetate) as a solvent, and "Shodex" (registered trademark) HFIP-806M (two columns) and HFIP-LG as columns. As a molecular weight standard, polymethyl methacrylate is used.

In the present invention, the weight average molecular weight of the end-modified polyamide resin can be adjusted to a desired range by, for example, adjusting the amounts of the later-mentioned terminal modification agent represented by General Formula (III) and the terminal modification agent represented by General Formula (IV) to be added for the production of the end-modified polyamide resin, and/or the reaction time.

The end-modified polyamide resin in the present invention preferably has a melt viscosity of not more than 30 Pa·s at the melting point+60° C. at a shear rate of 9728 sec$^{-1}$. By setting the melt viscosity at the melting point+60° C. at a shear rate of 9728 sec$^{-1}$ to not more than 30 Pa·s, the impregnation property can be improved. The melt viscosity is more preferably not more than 20 Pa·s, still more preferably not more than 15 Pa·s, still more preferably not more than 10 Pa·s. On the other hand, from the viewpoint of ease of handling, the melt viscosity is more preferably not less than 0.1 Pa·s, still more preferably not less than 0.5, most preferably not less than 1.0.

The melt viscosity can be measured by retaining the end-modified polyamide resin at a temperature of the melting point of the end-modified polyamide resin+60° C. for 5 minutes to allow melting of the resin, and then performing measurement using a capillary flow meter at a shear rate of 9728 sec$^{-1}$. In the present invention, to provide an index for evaluation of the melt viscosity, the temperature condition of the melting point+60° C. was selected since, at this temperature, a melt-fluidity-improving effect easily appears, and thermal decomposition is less likely to proceed in a short period of retention. Further, the shear rate of 9728 sec$^{-1}$ was selected to provide high-shear conditions based on assumption of conditions during impregnation with the resin.

In the present invention, the melt viscosity of the end-modified polyamide resin can be adjusted to a desired range by, for example, adjusting the amounts of the later-mentioned terminal modification agent represented by General Formula (III) and the terminal modification agent represented by General Formula (IV) to be added for the production of the end-modified polyamide resin, and/or the reaction time.

In the end-modified polyamide resin in the present invention, the content retention rate of the end structure represented by General Formula (I) after 60 minutes of retention at the melting point+60° C. ((content after retention/content before retention)×100) is preferably not less than 80%. By setting the content retention rate of the end structure represented by General Formula (I) to not less than 80%, the amount of gas generated by thermal decomposition of the end structure represented by General Formula (I) in the end-modified polyamide resin during the melt retention can be reduced; the thermal stability during the melt retention can be improved; the void due to the generated gas can be reduced; and the surface quality can be improved. The content retention rate of the end structure represented by General Formula (I) is more preferably not less than 85% by mass, still more preferably not less than 90% by mass. From the viewpoint of mechanical characteristics, the content retention rate of the end structure represented by General Formula (I) is preferably not more than 100%.

The content retention rate can be calculated by determining the content of the end structure represented by General Formula (I) in the end-modified polyamide resin by the measurement described above, and then retaining the resin in a capillary flow meter at a temperature of the melting point of the end-modified polyamide resin+60° C. for 60 minutes, followed by similarly determining the content of the end structure represented by General Formula (I), dividing the resulting value by the content of the end structure represented by General Formula (I) before the melt retention, and then multiplying the resulting value by 100. In the present invention, to provide an index for evaluation of the melt viscosity, the temperature condition of the melting point+60° C. was selected since, at this temperature, a melt-fluidity-improving effect easily appears, and thermal decomposition is less likely to proceed in a short period of retention.

In the present invention, the content retention rate of the end structure represented by General Formula (I) of the end-modified polyamide resin can be adjusted to a desired range by, for example, adjusting the amounts of the later-mentioned terminal modification agent represented by General Formula (III) and the terminal modification agent represented by General Formula (IV) to be added for the production of the end-modified polyamide resin, and/or the reaction time.

The weight average molecular weight retention rate of the end-modified polyamide resin in the present invention after 60 minutes of retention at the melting point+60° C. ((weight average molecular weight after retention/weight average molecular weight before retention)×100) is preferably 80 to 120% (not less than 80% and not more than 120%). By setting the weight average molecular weight retention rate to not less than 80%, mechanical characteristics can be improved. The weight average molecular weight retention rate is more preferably not less than 85%, still more preferably not less than 90%. On the other hand, by setting the weight average molecular weight retention rate to not more than 120%, the melt viscosity can be reduced, and the impregnation property can be improved. The weight average molecular weight retention rate is more preferably not more than 115%, still more preferably not more than 110%.

The weight average molecular weight retention rate can be calculated by measuring the weight average molecular weight of the end-modified polyamide resin by the gel permeation chromatography (GPC) described above, and then retaining the resin in a capillary flow meter at a temperature of the melting point of the end-modified polyamide resin+60° C. for 60 minutes, followed by similarly measuring the weight average molecular weight, dividing the resulting value by the weight average molecular weight before the melt retention, and then multiplying the resulting value by 100. In the present invention, to provide an index for evaluation of the melt viscosity, the temperature condition of the melting point+60° C. was selected since, at this temperature, a melt-fluidity-improving effect easily appears, and thermal decomposition is less likely to proceed in a short period of retention.

In the present invention, the weight average molecular weight retention rate of the end-modified polyamide resin can be adjusted to a desired range by, for example, adjusting the amounts of the later-mentioned terminal modification agent represented by General Formula (III) and the terminal modification agent represented by General Formula (IV) to be added for the production of the end-modified polyamide resin, and/or the reaction time.

The melt viscosity retention rate of the end-modified polyamide resin in the present invention after 60 minutes of retention at the melting point+60° C. ((melt viscosity after retention/melt viscosity before retention)×100) is preferably 80% to 120% (not less than 80% and not more than 120%). By setting the melt viscosity retention rate to not less than 80%, the impregnation property and mechanical characteristics can be improved. The melt viscosity retention rate is more preferably not less than 85%, still more preferably not less than 90%, still more preferably not less than 95%. On the other hand, by setting the melt viscosity retention rate to not more than 120%, the impregnation property can be improved. The melt viscosity retention rate is more preferably not more than 115%, still more preferably not more than 110%.

The melt viscosity retention rate can be determined by retaining the end-modified polyamide resin at a temperature of the melting point of the end-modified polyamide resin+60° C. for 5 minutes to allow melting of the resin, performing measurement of the melt viscosity (melt viscosity before retention) using a capillary flow meter at a shear rate of 9728 sec$^{-1}$, retaining the end-modified polyamide resin at a temperature of the melting point of the end-modified polyamide resin+60° C. for 60 minutes, performing measurement of the melt viscosity (melt viscosity after retention) using a capillary flow meter at a shear rate of 9728 sec$^{-1}$, and then performing calculation as follows: (melt viscosity after retention/melt viscosity before retention)×100. In the present invention, to provide an index for evaluation of the melt viscosity retention rate, the temperature condition of the melting point+60° C. was selected since, at this temperature, a melt-fluidity-improving effect easily appears, and thermal decomposition is less likely to proceed in a short period of retention. Further, the shear rate of 9728 sec$^{-1}$ was selected to provide high-shear conditions based on assumption of conditions for impregnation with the resin.

In the present invention, the melt viscosity retention rate of the end-modified polyamide resin can be adjusted to a desired range by, for example, adjusting the amounts of the later-mentioned terminal modification agent represented by General Formula (III) and the terminal modification agent represented by General Formula (IV) to be added for the production of the end-modified polyamide resin, and/or the reaction time.

In the end-modified polyamide resin in the present invention, the weight reduction rate after 40 minutes of retention under a nitrogen atmosphere at the melting point+60° C. is preferably not more than 4%. By setting the weight reduction rate to not more than 4%, void in the fiber-reinforced end-modified polyamide resin due to the gas generated by thermal decomposition during the processing, and the like can be suppressed; mechanical characteristics can be improved; and deterioration of the surface quality due to deterioration of the resin or the like can be suppressed. The weight reduction rate is more preferably not more than 3%, still more preferably not more than 2%.

The weight reduction rate can be measured using a thermogravimetric analyzer (TGA). In the present invention, to provide an index for evaluation of the weight reduction rate, the temperature condition of the melting point+60° C. was selected since, at this temperature, a melt-fluidity-improving effect easily appears, and thermal decomposition is less likely to proceed in a short period of retention.

In the present invention, the weight reduction rate of the end-modified polyamide resin can be adjusted to a desired range by, for example, adjusting the amounts of the later-mentioned terminal modification agent represented by General Formula (III) and the terminal modification agent represented by General Formula (IV) to be added for the production of the end-modified polyamide resin, and/or the reaction time.

The method for producing the end-modified polyamide resin used in embodiments of the present invention is described below.

Examples of the method for producing the polyamide resin used in embodiments of the present invention include:

(1) a method in which a polyamide resin, a terminal modification agent(s), and, when necessary, other components, are melt-kneaded at not less than the melting point of the polyamide resin to allow the reaction to proceed, or a method in which these are mixed together in a solution to allow the reaction to proceed, followed by removing the solvent; and (2) a method in which a raw material constituting the main structural unit of the polyamide resin (main raw material of the polyamide resin), a terminal modification agent(s), and, when necessary, other components, are added to allow the reaction to proceed (addition-upon-reaction method).

Examples of the terminal modification agent in embodiments of the present invention include saturated aliphatic compounds, unsaturated aliphatic compounds, and aromatic compounds. Two or more of these may be used. From the viewpoint of improving the fluidity, this terminal modification agent is preferably a saturated aliphatic compound or an aromatic compound, more preferably a saturated aliphatic compound.

Examples of the saturated aliphatic compound include cyclic saturated aliphatic compounds such as monocyclic cycloalkane compounds including cyclopropane, cyclobutane, cyclopentane, cyclohexane, cycloheptane, cyclooctane, cyclononane, cyclodecane, cycloundecane, and cyclododecane, and bicyclic cycloalkane compounds including decahydronaphthalene; and chain saturated aliphatic compounds such as $C_1$-$C_{15}$ hydrocarbon compounds including methane, ethane, propane, butane, pentane, hexane, heptane, octane, nonane, decane, undecane, dodecane, tridecane, tetradecane, and heptadecane. The cyclic saturated aliphatic compound may have a branched structure, and the chain saturated aliphatic compound may have either a linear structure or a branched structure.

The terminal modification agent in embodiments of the present invention is preferably a saturated aliphatic compound having at least one end structure represented by the following General Formula (V).

-(a-A)$_r$-W　　　　(V)

In the General Formula (V), A represents a $C_1$-$C_{12}$ alkylene group or a $C_6$-$C_{24}$ arylene group. a represents an atom other than a carbon atom or a hydrogen atom, or a single bond. r represents the repeat number of the structural unit represented by (a-A), and is not less than 1. W represents a hydroxyl group, aldehyde group, carboxyl group, sulfo group, amino group, glycidyl group, isocyanate group, carbodiimide group, oxazoline group, oxazine group, ester group, amide group, silanol group, or silyl ether group.

Preferably, in embodiments of the present invention, from the viewpoint of improving the impregnation property, A in the General Formula (V) is a residue formed by removal of two hydrogen atoms from the chain saturated aliphatic compound; r is 1 to 100, and W is a hydroxyl group. In cases where r is not less than 1, the impregnation property can be improved. r is more preferably not less than 3, still more preferably not less than 5. On the other hand, in cases where r is less than 100, mechanical characteristics can be improved. r is more preferably not more than 70. From the viewpoint of improving the impregnation property and mechanical characteristics, a is preferably an oxygen atom or a single bond, more preferably an oxygen atom.

The terminal modification agent in embodiments of the present invention may have one end structure represented by the General Formula (V), or may have not less than two such end structures. From the viewpoint of improving the impregnation property and mechanical characteristics, the compound preferably has one to four structures represented by the General Formula (V), more preferably one to three such structures.

The following is a description for examples of cases where the end-modified polyamide resin in embodiments of the present invention has an end structure represented by the General Formula (I) and an end structure represented by the General Formula (II). Examples of the method for producing such an end-modified polyamide resin include a method in which a raw material of a polyamide resin is reacted with a terminal modification agent represented by the General Formula (III) and a terminal modification agent represented by the following General Formula (IV) during the polymerization, and a method in which a polyamide resin and terminal modification agents are melt-kneaded. Examples of the method for performing the reaction during the polymerization include a method in which the raw material of the polyamide resin is preliminarily mixed with the terminal modification agents, and the resulting mixture is heated to allow the condensation to proceed, and a method in which the terminal modification agents are added in the middle of the polymerization of the raw material as the main component, to allow binding of the terminal modification agents.

An end-modified polyamide resin having an end structure represented by the General Formula (I) can be polymerized using a terminal modification agent represented by the following General Formula (III). For example, in polymerization of amino acid, lactam, and/or diamine and dicarboxylic acid (in other words, in polymerization using as a main raw material(s) at least one selected from the group consisting of a combination of diamine and dicarboxylic acid; amino acid; and lactam), a terminal modification agent represented by the following General Formula (III) is included in an amount of 1 to 20% by mass (not less than 1% by mass and not more than 20% by mass) with respect to the total of the amino acid, lactam, diamine, and dicarboxylic acid (main raw materials), and the terminal modification agent is bound to an end of the polyamide resin. By this, an end-modified polyamide resin containing an end structure represented by the General Formula (I) at 1 to 20% by mass can be obtained.

In the General Formula (III), n represents a range of 2 to 100. Similarly to m in the General Formula (I), n is preferably not less than 5, more preferably not less than 8, still more preferably not less than 16. On the other hand, n is preferably not more than 70, more preferably not more than 50. $R^1$ represents a $C_2$-$C_{10}$ divalent hydrocarbon group, and $R^2$ represents a $C_1$-$C_{30}$ monovalent hydrocarbon group. Their examples include those exemplified for $R^1$ and $R^2$, respectively, in General Formula (I). X-represents —NH—, —N(CH$_3$)—, or —O(C═O)—. —NH— is more preferred since it has excellent reactivity with a polyamide end.

An end-modified polyamide resin having an end structure represented by the General Formula (II) can be polymerized using a terminal modification agent represented by the following General Formula (IV). For example, in polymerization of amino acid, lactam, and/or diamine and dicarboxylic acid (in other words, in polymerization using as a main raw material(s) at least one selected from the group consisting of a combination of diamine and dicarboxylic acid; amino acid; and lactam), a terminal modification agent represented by the following General Formula (IV) is included in an amount of 0.1 to 5% by mass (not less than 0.1% by mass and not more than 5% by mass) with respect to the total of the amino acid, lactam, diamine, and dicarboxylic acid (main raw materials), and the terminal modification agent is bound to an end of the polyamide resin. By this, an end-modified polyamide resin containing an end structure represented by the General Formula (II) at 0.1 to 5% by mass can be obtained.

In the General Formula (IV), $R^3$ represents a $C_1$-$C_{30}$ monovalent hydrocarbon group. Similarly to the case of the General Formula (II), from the viewpoint of thermal stability and discoloration prevention of the end-modified polyamide resin, $R^3$ is more preferably a monovalent saturated hydrocarbon group. In cases where X in the General Formula (III) is —NH— or —N(CH$_3$)—, —Y— in the General Formula (IV) represents —O(C═O)—, and in cases where X in the General Formula (III) is —O(C═O)—, Y in the General Formula (IV) represents —NH— or —N(CH$_3$)—.

The number average molecular weight of the terminal modification agent represented by General Formula (III) is preferably 500 to 10,000. By setting the number average molecular weight to not less than 500, the melt viscosity can be reduced, and the impregnation property can be improved. The number average molecular weight is more preferably not less than 800, still more preferably not less than 900. On the other hand, by setting the number average molecular weight to not more than 10,000, affinity to the main structural unit of the polyamide resin can be improved, and mechanical characteristics of the base material can be improved. The number average molecular weight is more preferably not more than 5,000, still more preferably not more than 2,500, still more preferably not more than 1,500.

Specific examples of the terminal modification agent represented by General Formula (III) include methoxy poly(ethylene glycol) amine, methoxy poly(trimethylene glycol) amine, methoxy poly(propylene glycol) amine, methoxy poly(tetramethylene glycol) amine, methoxy poly(ethylene glycol) poly(propylene glycol) amine, methoxy poly(ethylene glycol) carboxylic acid, methoxy poly(trimethylene glycol) carboxylic acid, methoxy poly(propylene glycol) carboxylic acid, methoxy poly(tetramethylene glycol) carboxylic acid, and methoxy poly(ethylene glycol) poly(propylene glycol) carboxylic acid. In cases where two kinds of polyalkylene glycols are contained, a block polymer structure may be formed, or a random copolymer structure may be formed. Two or more of the terminal modification agents described above may be used.

Specific examples of the terminal modification agent represented by General Formula (IV) include aliphatic monocarboxylic acids such as acetic acid, propionic acid, butyric acid, valeric acid, caproic acid, enanthic acid, caprylic acid, pelargonic acid, undecanoic acid, lauric acid, tridecanoic acid, myristic acid, myristoleic acid, palmitic acid, stearic acid, oleic acid, linoleic acid, arachic acid, and cerotic acid; alicyclic monocarboxylic acids such as cyclohexane carboxylic acid and methylcyclohexane carboxylic acid; aromatic monocarboxylic acids such as benzoic acid, toluic acid, ethyl benzoate, and phenyl acetate; aliphatic monoamines such as methylamine, ethylamine, propylamine, butylamine, pentylamine, hexylamine, heptylamine, octylamine, 2-ethyihexylamine, nonylamine, decylamine, undecylamine, dodecylamine, tridecylamine, tetradecylamine, pentadecylamine, hexadecylamine, octadecylamine, nonadecylamine, and icosylamine; alicyclic monoamines such as cyclohexylamine and methylcyclohexylamine; and aromatic monoamines such as benzylamine and β-phenylethylamine. Two or more of the terminal modification agents described above may be used. The following is a description for examples of the method for obtaining an end-modified polyamide resin in which the end-modified polyamide resin in the present invention has an end structure represented by the General Formula (I) and an end structure represented by the General Formula (II). The methods (1) and (2) described above are further described below in more detail.

(1) In cases where the polyamide resin and the terminal modification agents are melt-kneaded to produce the end-modified polyamide resin, the melt-kneading temperature for the reaction is preferably higher than the melting point (Tm) of the polyamide resin by 10° C. to 40° C. For example, in cases where the melt-kneading is carried out using an extruder, the cylinder temperature of the extruder is preferably set within this range. By setting the melt-kneading temperature within this range, ends of the polyamide resin and the terminal modification agents can be efficiently bound to each other while evaporation of the terminal modification agents and decomposition of the polyamide resin are suppressed. Examples of the polyamide resin include the polyamide resins described above.

(2) In cases where the end-modified polyamide resin is produced by a method in which the raw material of the polyamide resin is reacted with the terminal modification agents during the polymerization, the reaction may be carried out either by a melt polymerization method based on reaction at a temperature which is not less than the melting point of the polyamide resin, or by a solid phase polymerization method based on reaction at a temperature lower than the melting point of the polyamide resin. Examples of the raw material of the polyamide resin include the amino acid, lactam, and "mixture of diamine and dicarboxylic acid".

Preferably, more specifically, the raw material of the end-modified polyamide resin is fed to a reaction vessel, and, after nitrogen purge, the reaction is allowed to proceed by heating. In cases where the reaction time in this process is too short, an increase in the molecular weight is inhibited, and oligomer components increase, which may lead to deterioration of mechanical properties. Thus, the time length of the nitrogen flow during the reaction time is preferably not less than 15 minutes. On the other hand, in cases where the reaction time is too long, discoloration and the like may occur due to the progress of thermal decomposition. Thus, the time length of the nitrogen flow during the reaction time is preferably not more than 8 hours.

When the end-modified polyamide resin is produced by a method in which the raw material of the polyamide resin is reacted with the terminal modification agents during the polymerization, a polymerization promoter may be added, if necessary. Examples of the polymerization promoter include inorganic phosphorus compounds such as phosphoric acid, phosphorous acid, hypophosphorous acid, pyrophosphoric acid, and polyphosphoric acid, and their alkali metal salts and alkaline earth metal salts. Sodium phosphite or sodium hypophosphite is especially preferably used. The polymerization promoter is preferably used in an amount within the range of 0.001 to 1 part by mass with respect to 100 parts by mass of the raw material (excluding the terminal modification agents) of the polyamide resin. By setting the amount of the polymerization promoter added to 0.001 to 1 part by mass, the end-modified polyamide resin can have a better balance between mechanical characteristics and the impregnation property.

The fiber-reinforced polyamide resin base material in embodiments of the present invention is prepared by impregnating continuous reinforcing fibers, or a reinforcing fiber base material in which discontinuous-fiber reinforcing fibers are dispersed, with the end-modified polyamide resin described above. When necessary, the fiber-reinforced polyamide resin base material may also contain fillers, other polymers, additives, and the like.

As the filler, an arbitrary filler commonly used as a resin filler may be used. By this, strength, rigidity, heat resistance, and dimensional stability of the fiber-reinforced polyamide resin base material or its molded article can be improved. Examples of the filler include fibrous inorganic fillers such as glass fibers, carbon fibers, potassium titanate whiskers, zinc oxide whiskers, aluminum borate whiskers, aramid fibers, alumina fibers, silicon carbide fibers, ceramic fibers, asbestos fibers, gypsum fibers, and metal fibers; and non-fibrous inorganic fillers such as wollastonite, zeolite, sericite, kaolin, mica, talc, clay, pyrophyllite, bentonite, montmorillonite, asbestos, aluminosilicate, alumina, silicon oxide, magnesium oxide, zirconium oxide, titanium oxide, iron oxide, calcium carbonate, magnesium carbonate, dolomite, calcium sulfate, barium sulfate, magnesium hydroxide, calcium hydroxide, aluminum hydroxide, glass beads, ceramic beads, boron nitride, silicon carbide, and silica. Two or more of these may be contained. These fillers may be hollow fillers. The fillers may be treated with a coupling agent such as an isocyanate-based compound, organosilane-based compound, organotitanate-based compound, organoborane-based compound, or epoxy compound. As the montmorillonite, an organized montmorillonite produced by cation exchange of interlayer ions with an organic ammonium salt may be used. In a fiber-reinforced polyamide resin base material in the first mode, a fibrous filler composed of discontinuous fibers can give its function without deteriorating the reinforcing effect of the reinforcing fiber in the fiber-reinforced polyamide resin base material. On the other hand, in a fiber-reinforced polyamide resin base material in the second mode, a fibrous filler may be used within a range in which the reinforcing effect of the discontinuous fiber base material is not deteriorated.

Examples of the other polymers include polyolefins such as polyethylenes and polypropylenes; elastomers such as polyamide-based elastomers and polyester-based elastomers; polyesters; polycarbonates; polyphenylene ethers; polyphenylene sulfides; liquid crystal polymers; polysulfones, polyether sulfones; ABS resins; SAN resins; and polystyrenes. Two or more of these may be contained. For enhancement of the impact resistance of the fiber-reinforced polyamide resin base material, an impact resistance improver is preferably used, and examples of the impact resistance improver include modified polyolefins such as (co)polymers of an olefin-based compound and/or a conjugated diene-based compound; polyamide-based elastomers; and polyester-based elastomers.

Examples of the (co)polymers of an olefin-based compound and/or a conjugated diene-based compound include ethylene-based copolymers, conjugated diene-based polymers, and conjugated diene-aromatic vinyl hydrocarbon-based copolymers.

Examples of the ethylene-based copolymers include copolymers of ethylene with an α-olefin having not less than 3 carbon atoms, unconjugated diene, vinyl acetate, vinyl alcohol, or α,β-unsaturated carboxylic acid or a derivative thereof. Examples of the α-olefin having not less than 3 carbon atoms include propylene and butene-1. Examples of the unconjugated diene include 5-methylidene-2-norbornene, 5-ethylidene-2-norbornene, dicyclopentadiene, and 1,4-hexadiene. Examples of the α,β-unsaturated carboxylic acid include acrylic acid, methacrylic acid, ethacrylic acid, crotonic acid, maleic acid, fumaric acid, itaconic acid, citraconic acid, and butenedicarboxylic acid. Examples of the derivative of the α,β-unsaturated carboxylic acid include alkyl esters, aryl esters, glycidyl esters, acid anhydrides, and imides of the α,β-unsaturated carboxylic acid.

The conjugated diene-based polymer means a polymer of at least one conjugated diene. Examples of the conjugated diene include 1,3-butadiene, isoprene(2-methyl-1,3-butadiene), 2,3-dimethyl-1,3-butadiene, and 1,3-pentadiene. Part or all of the unsaturated bonds in these polymers may be reduced by hydrogenation.

The conjugated diene-aromatic vinyl hydrocarbon-based copolymer means a copolymer of a conjugated diene and an aromatic vinyl hydrocarbon, and may be either a block copolymer or a random copolymer. Examples of the conjugated diene include 1,3-butadiene and isoprene. Examples of the aromatic vinyl hydrocarbon include styrene. In the conjugated diene-aromatic vinyl hydrocarbon-based copolymer, part or all of the unsaturated bonds other than the double bonds of aromatic rings may be reduced by hydrogenation.

Specific examples of the impact resistance improver include ethylene/methacrylic acid copolymers, and copolymers wherein part or all of the carboxylic acid moieties in these copolymers are a sodium, lithium, potassium, zinc, and/or calcium salt(s); ethylene/propylene-g-maleic anhydride copolymers; and ethylene/butene-1-g-maleic anhydride copolymers.

Examples of the additives include antioxidants and heat-resistant stabilizers (hindered phenol-based, hydroquinone-based, or phosphite-based agents and substitution products thereof, such as copper halides and iodine compounds), weather-proofing agents (resorcinol-based, salicylate-based, benzotriazole-based, benzophenone-based, or hindered amine-based agents and the like), mold release agents and lubricants (aliphatic alcohols, aliphatic amides, aliphatic bisamides, bis-urea, polyethylene waxes, and the like), pigments (cadmium sulfide, phthalocyanine, carbon black, and the like), dyes (nigrosine, aniline black, and the like), plasticizers (octyl p-oxybenzoate, N-butylbenzenesulfonamide, and the like), antistatic agents (alkyl sulfate-type anionic antistatic agents; quaternary ammonium salt-type cationic antistatic agents; nonionic antistatic agents such as polyoxyethylene sorbitan monostearate; betaine-based amphoteric antistatic agents, and the like), and flame retardants (melamine cyanurate; hydroxides such as magnesium hydroxide and aluminum hydroxide; ammonium polyphosphate; brominated polystyrenes, brominated polyphenylene oxides, brominated polycarbonates, and brominated epoxy resins, and combinations of these bromine-based flame retardants with antimony trioxide). Two or more of these may be contained.

The fiber-reinforced polyamide resin base material in an embodiment of the present invention can be obtained by impregnating continuous reinforcing fibers with an end-modified polyamide resin (first mode). Alternatively, it can be obtained by impregnating a reinforcing fiber base material in which discontinuous reinforcing fibers are dispersed, with an end-modified polyamide resin (second mode).

Examples of the method for impregnating continuous reinforcing fibers with an end-modified polyamide resin in the first mode include a film method in which a film-shaped end-modified polyamide resin is melt and pressurized to impregnate reinforcing fiber bundles with the end-modified polyamide resin; a comingled method in which a fiber-shaped end-modified polyamide resin and reinforcing fiber bundles are subjected to mixed spinning, and then the fiber-shaped end-modified polyamide resin is melt and pressurized to impregnate the reinforcing fiber bundles with the end-modified polyamide resin; a powder method in which a powder-shaped end-modified polyamide resin is dispersed in gaps of fibers in reinforcing fiber bundles, and then the powder-shaped end-modified polyamide resin is melt and pressurized to impregnate the reinforcing fiber bundles with the end-modified polyamide resin; and a pultrusion method in which reinforcing fiber bundles are immersed in a melt end-modified polyamide resin, and then the reinforcing fiber bundles are impregnated with the end-modified polyamide resin by pressurization. A pultrusion method is preferred since it enables preparation of various types of fiber-reinforced polyamide resin base materials having, for example, different thicknesses or fiber volume contents.

The fiber-reinforced polyamide resin base material in the first mode of the present invention preferably has a thickness of 0.1 to 10 mm. In cases where the thickness is not less than 0.1 mm, molded articles obtained using the fiber-reinforced polyamide resin base material can have improved strength. The thickness is more preferably not less than 0.2 mm. On the other hand, in cases where the thickness is not more than 1.5 mm, the reinforcing fibers can be more easily impregnated with the end-modified polyamide resin. The thickness is more preferably not more than 1 mm, still more preferably not more than 0.7 mm, still more preferably not more than 0.6 mm.

The fiber-reinforced polyamide resin base material in the first mode of the present invention preferably has a volume content of 20 to 70% by volume. In other words, the reinforcing fibers are preferably contained in an amount of 20 to 70% by volume (not less than 20% by volume and not more than 70% by volume) with respect to the total fiber-reinforced polyamide resin base material (100% by volume). In cases where the reinforcing fibers are contained in an amount of not less than 20% by volume, molded articles obtained using the fiber-reinforced polyamide resin base material can have improved strength. The volume content is more preferably not less than 30% by volume, still more preferably not less than 40% by volume. On the other hand, in cases where the reinforcing fibers are contained in an amount of not more than 70% by volume, the reinforcing fibers can be more easily impregnated with the end-modified polyamide resin. The volume content is more preferably not more than 60% by volume, still more preferably not more than 55% by volume. The volume content can be adjusted to a desired range by adjusting the amounts of the reinforcing fibers and the end-modified polyamide resin to be added.

The volume content of the reinforcing fibers in the fiber-reinforced polyamide resin base material ($V_f$) can be determined by measuring the mass of the fiber-reinforced polyamide resin base material $W_0$, heating the fiber-reinforced polyamide resin base material in air at 500° C. for 30 minutes to burn out the polyamide resin component, measuring the mass of the remaining reinforcing fibers $W_1$, and then performing calculation according to the following equation.

$$V_f(\% \text{ by volume}) = (W_1/\rho_f)/\{W_1/\rho_f + (W_0 - W_1)/\rho_r\} \times 100$$

$\rho_f$: Density of reinforcing fibers (g/cm$^3$)
$\rho_r$: Density of the end-modified polyamide resin (g/cm$^3$)

For the fiber-reinforced polyamide resin base material in an embodiment of the present invention, a desired impregnation property can be selected depending on the use and the object thereof. Examples of the fiber-reinforced polyamide resin base material include prepregs having enhanced impregnation propertties, semi-impregnated semi-pregs, and fabrics having low impregnation properties. In general, as the impregnation property of the molding material increases, the length of time required for obtaining a molded article having excellent mechanical characteristics can be reduced, which is preferred.

Examples of the method for impregnating a reinforcing fiber base material in which discontinuous fibers are dispersed, with an end-modified polyamide resin in the second mode of the present invention include a method in which an end-modified polyamide resin is supplied with an extruder to impregnate a reinforcing fiber base material therewith; a method in which a powder-shaped end-modified polyamide resin is dispersed in a fiber layer of a reinforcing fiber base material, and then melt; a method in which an end-modified polyamide resin is formed into a film, and then laminated with a reinforcing fiber base material; a method in which an end-modified polyamide resin is dissolved in a solvent, and a reinforcing fiber base material is impregnated with the resin in the solution state, followed by evaporating the solvent; a method in which an end-modified polyamide resin is formed into fibers, and then mixed with the discontinuous fibers to prepare mixed fibers; a method in which a reinforcing fiber base material is impregnated with a precursor of an end-modified polyamide resin, and then polymerization is carried out to prepare an end-modified polyamide resin; and a method in which a melt-blown non-woven fabric is used to perform lamination. Any of these methods may be used. The method in which an end-modified polyamide resin is supplied with an extruder to impregnate a reinforcing fiber base material therewith has an advantage that the end-modified polyamide resin does not need to be processed; the method in which a powder-shaped end-modified polyamide resin is dispersed in a fiber layer of a reinforcing fiber base material, and then melt has an advantage that the impregnation can be easily achieved; and the method in which an end-modified polyamide resin is formed into a film, and then laminated with a reinforcing fiber base material has an advantage that a product with a relatively high quality can be obtained.

The fiber-reinforced polyamide resin base material in the second mode of the present invention preferably has a thickness of 0.1 to 10 mm. In cases where the thickness is not less than 0.1 mm, molded articles obtained using the fiber-reinforced polyamide resin base material can have improved strength. The thickness is more preferably not less than 1 mm. On the other hand, in cases where the thickness is not more than 10 mm, the reinforcing fibers can be more easily impregnated with the end-modified polyamide resin. The thickness is more preferably not more than 7 mm, still more preferably not more than 5 mm.

The fiber-reinforced polyamide resin base material in the second mode of the present invention preferably has a volume content of 20 to 70% by volume. In other words, the discontinuous fibers are preferably contained in an amount of not less than 20% by volume and not more than 70% by volume with respect to the total fiber-reinforced polyamide resin base material (100% by volume). In cases where the discontinuous fibers are contained in an amount of not less than 20% by volume, molded articles obtained using the fiber-reinforced polyamide resin base material can have improved strength. The volume content is more preferably not less than 30% by volume. On the other hand, in cases where the discontinuous fibers are contained in an amount of not more than 70% by volume, the discontinuous fibers can be more easily impregnated with the end-modified polyamide resin. The volume content is more preferably not more than 60% by volume, still more preferably not more than 50% by volume. The volume content can be calculated by the equation (VI) described above.

For the fiber-reinforced polyamide resin base material in the second mode of the present invention, a desired impregnation property can be selected depending on the use and the object thereof. In general, as the impregnation property of the molding material increases, the length of time required for obtaining a molded article having excellent mechanical characteristics can be reduced, which is preferred.

In the production of the fiber-reinforced polyamide resin base material in the second mode of the present invention, examples of the method for adjusting the thickness and the volume content of the base material to desired values include a method by heating pressurization using a pressing machine. The pressing machine is not limited as long as the temperature and the pressure required for the impregnation with the end-modified polyamide resin can be realized. A normal press machine, which has a flat platen that moves up and down, or the so-called double belt press machine, which has a mechanism in which a pair of endless steel belts run, may be used.

By laminating one or more fiber-reinforced polyamide resin base materials in the first and/or second mode(s) of the present invention together in an arbitrary constitution, and then performing molding while, if necessary, applying heat and/or pressure, a molded article can be obtained.

Examples of the method for applying heat and/or pressure include a press molding method in which a fiber-reinforced end-modified polyamide resin(s) laminated in an arbitrary constitution is/are placed in a mold or on a press plate, and then the mold or the press plate is closed to apply pressure; an autoclave molding method in which a molding material(s) laminated in an arbitrary constitution is/are fed to an autoclave, and then pressurized and heated; a bagging molding method in which a molding material(s) laminated in an arbitrary constitution is/are wrapped with a film or the like, and the internal pressure is reduced, followed by heating the material(s) in an oven while applying atmospheric pressure; a wrapping tape method in which a tape is wound under tension around a fiber-reinforced end-modified polyamide resin(s) laminated in an arbitrary constitution, and then the resin(s) is/are heated in an oven; and an internal pressure molding method in which a fiber-reinforced end-modified polyamide resin(s) laminated in an arbitrary constitution is/are placed in a mold, and a gas, liquid, or the like is injected into a core similarly placed in the mold, to apply pressure. In particular, a molding method in which pressing is carried out using a mold is preferably employed since the obtained molded article has less void therein, and has an excellent external appearance quality.

As the press molding method, a hot press method in which a fiber-reinforced polyamide resin base material is preliminarily placed in a mold, and then pressurization and heating are carried out while performing mold clamping, followed by cooling the fiber-reinforced polyamide resin base material by cooling the mold while continuing the mold clamping, thereby obtaining a molded article; or stamping molding in which a fiber-reinforced polyamide resin base material is preliminarily heated to not less than the melting temperature of the end-modified polyamide resin using a heater such as an infrared heater, heating plate, high-temperature oven, or dielectric heater to melt and soften the end-modified polyamide resin, and the material is then placed on a mold corresponding to the bottom side of the molded shape, followed by closing the mold to perform mold clamping, and then performing pressurization and cooling; may be employed. Although the press molding method is not limited, from the viewpoint of accelerating the molding cycle to increase the productivity, it is preferably stamping molding. The fiber-reinforced polyamide resin base materials in the first and second modes of the present invention and molded articles thereof can be subjected to integration by integral molding such as insert molding or outsert molding, by a highly productive adhesion technique such as correction treatment by heating, thermal welding, vibration welding, or ultrasonic welding, or by using an adhesive, to thereby obtain a complex.

The complex is preferably a composite molded article in which a fiber-reinforced polyamide resin base material in the first or second mode of the present invention is at least partly bonded to a molded article containing a thermoplastic resin.

The molded article (molding base material or molded article) containing a thermoplastic resin to be integrated with the fiber-reinforced polyamide resin base material in the first or second mode of the present invention is not limited, and examples of the molded article include resin materials and molded articles thereof, metal materials and molded articles thereof, and inorganic materials and molded articles thereof. In particular, resin materials and molded articles thereof are preferred from the viewpoint of adhesive strength to the fiber-reinforced end-modified polyamide resin in the present invention.

The matrix resin of the molding material or molded article to be integrated with the fiber-reinforced polyamide resin base material in the first or second mode of the present invention may be the same as or different from the resin of the fiber-reinforced polyamide resin base material or a molded article thereof. For enhancement of the adhesive strength, the same kind of resin is preferably used. In cases where a different kind of resin is used, a resin layer is preferably provided at the interface.

EXAMPLES

The present invention is described below more concretely by way of Examples. However, the present invention is not limited to the description of these Examples. Evaluation of properties in each Example or Comparative Example was carried out according to the following method.
[Volume Content ($V_f$)]
The mass of the fiber-reinforced polyamide resin base material obtained by each Example or Comparative Example W0 was measured, and then the fiber-reinforced polyamide resin base material was heated in air at 500° C. for 30 minutes to burn out the polyamide resin component, followed by measuring the mass of the remaining reinforcing fibers W1, and then calculating the volume content of the fiber-reinforced polyamide resin base material ($V_f$) according to the following equation (VI).

$$V_f(\% \text{ by volume})=(W_1/\rho_f)/\{W_1/\rho_f+(W_0-W_1)/\rho_r\}\times 100$$

$\rho_f$: Density of reinforcing fibers (g/cm$^3$)
$\rho_r$: Density of the end-modified polyamide resin (g/cm$^3$)
[Relative Viscosity ($\eta_r$)]
A solution of the end-modified polyamide resin or the polyamide resin obtained by each Example or Comparative Example at a resin concentration of 0.01 g/mL in 98% sulfuric acid was subjected to measurement of the relative viscosity at 25° C. using an Ostwald viscometer.
[Molecular Weight]
In 4 mL of hexafluoroisopropanol (supplemented with 0.005 N sodium trifluoroacetate), 2.5 mg of the end-modified polyamide resin or the polyamide resin obtained by each Example or Comparative Example was dissolved, and the resulting solution was filtered through a 0.45-μm filter. Using the solution obtained, the number average molecular weight (Mn) and the weight average molecular weight (Mw) (weight average molecular weight before melt retention) were measured by GPC measurement. The measurement conditions were as follows.
Pump: e-Alliance GPC system (manufactured by Waters)
Detector: differential refractometer Waters 2414 (manufactured by Waters)
Columns: Shodex HFIP-806M (two columns)+HFIP-LG
Solvent: hexafluoroisopropanol (supplemented with 0.005 N sodium trifluoroacetate)
Flow rate: 1 mL/min.
Sample injection volume: 0.1 mL Temperature: 30° C.
Molecular weight standard: polymethyl methacrylate

[Amount of Amino End Groups [NH$_2$]]
To 0.5 g of the end-modified polyamide resin or the polyamide resin obtained by each Example or Comparative Example that was accurately weighed, 25 mL of a phenol/ethanol mixed solution (ratio: 83.5/16.5 by mass) was added, and the resin was dissolved at room temperature. Thereafter, titration was carried out with 0.02 N hydrochloric acid using thymol blue as an indicator to determine the amount of amino end groups (mol/t).
[Amount of Carboxyl End Groups [COOH]]
To 0.5 g of the end-modified polyamide resin or the polyamide resin obtained by each Example or Comparative Example that was accurately weighed, 20 mL of benzyl alcohol was added, and the resin was dissolved at a temperature of 195° C. Thereafter, titration was carried out at 195° C. with a solution of 0.02 N potassium hydroxide in ethanol using phenolphthalein as an indicator to determine the amount of carboxyl end groups (mol/t).
[Identification of End Structures, and Quantification of Content of End Structure of General Formula (I) and Content of End Structure of General Formula (II)]
The end-modified polyamide resin or the polyamide resin obtained by each Example or Comparative Example was subjected to $^1$H-NMR measurement using FT-NMR: JNM-AL400, manufactured by JAPAN ELECTRON OPTICS LABORATORY CO., LTD. First, using deuterated sulfuric acid as a measurement solvent, a solution with a sample concentration of 50 mg/mL was prepared. $^1$H-NMR measurement of the polyamide resin was carried out with a number of scans of 256. The peaks derived from the R$^1$ and R$^2$ moieties in the end structure represented by General Formula (I), the peak derived from the R$^3$ moiety in the end structure represented by General Formula (II), and the peak derived from the repeating structural unit of the polyamide resin skeleton were identified. The integrated intensity of each peak was calculated, and, based on the calculated integrated intensity and the number of hydrogen atoms in each structural unit, the content of the end structure represented by General Formula (I) [I] (mol/t, % by mass) (content before retention) and the content of the end structure represented by General Formula (II) [II] (mol/t, % by mass) in the end-modified polyamide resin were calculated.
[Melting Point]
Using a differential scanning calorimeter (DSC Q20) manufactured by TA Instruments, 5 to 7 mg of the end-modified polyamide resin or the polyamide resin obtained by each Example or Comparative Example was weighed, and the temperature was increased from 20° C. to 250° C. at a heating rate of 20° C./min. under a nitrogen atmosphere. The top of the endothermic peak that appeared during the temperature increase was determined as Tm (melting point).
[Melt Viscosity]
The end-modified polyamide resin or the polyamide resin obtained by each Example or Comparative Example was dried in a vacuum drier at 80° C. for not less than 12 hours. Using a capillary flow meter (manufactured by Toyo Seiki Seisaku-sho, Ltd.; Capirograph 1C Type) as a measuring apparatus for the melt viscosity, and using an orifice of 0.5 mm diameter and 5 mm length, the melt viscosity (melt viscosity before retention) was measured at the melting point+60° C. at a shear rate of 9728 sec$^{-1}$. The measurement was carried out after five minutes of retention for melting the end-modified polyamide resin or the polyamide resin. The smaller the melt viscosity value, the higher the fluidity.
[Melt Viscosity Retention Rate]
The end-modified polyamide resin or the polyamide resin obtained by each Example or Comparative Example was dried in a vacuum drier at 80° C. for not less than 12 hours.

Using a capillary flow meter (manufactured by Toyo Seiki Seisaku-sho, Ltd.; Capirograph 1C Type), and using an orifice of 0.5 mm diameter and 5 mm length, melt retention was performed at the melting point+60° C. for 60 minutes, and then the melt viscosity (melt viscosity after retention) was measured at a shear rate of 9728 sec$^{-1}$. Based on the melt viscosity (melt viscosity before retention) and the melt viscosity (melt viscosity after retention) measured by the method described above, the melt viscosity retention rate [%] was calculated as follows: (melt viscosity after retention/melt viscosity before retention)×100.

[Weight Average Molecular Weight Retention Rate]

The end-modified polyamide resin or the polyamide resin obtained by each Example or Comparative Example was dried in a vacuum drier at 80° C. for not less than 12 hours. Using a capillary flow meter (manufactured by Toyo Seiki Seisaku-sho, Ltd.; Capirograph 1C Type), and using an orifice of 0.5 mm diameter and 5 mm length, melt retention was carried out at the melting point+60° C. for 60 minutes. The end-modified polyamide resin or the polyamide resin after the melt retention was subjected to measurement of the weight average molecular weight (Mw) (weight average molecular weight after retention) by the same GPC measurement as in the method for measuring the molecular weight described above. Based on the weight average molecular weight (weight average molecular weight before melt retention) and the weight average molecular weight (weight average molecular weight after retention) measured by the method described above, the weight average molecular weight retention rate [%] was calculated as follows: (weight average molecular weight after retention/weight average molecular weight before retention)×100.

[Content Retention Rate]

The end-modified polyamide resin or the polyamide resin obtained by each Example or Comparative Example was dried in a vacuum drier at 80° C. for not less than 12 hours. Using a capillary flow meter (manufactured by Toyo Seiki Seisaku-sho, Ltd.; Capirograph 1C Type), and using an orifice of 0.5 mm diameter and 5 mm length, melt retention was carried out at the melting point+60° C. for 60 minutes. The end-modified polyamide resin or the polyamide resin after the melt retention was subjected to $^1$H-NMR measurement in the same manner as in the method for measuring the end structure content described above, to calculate the content of the end structure represented by General Formula (I) [I] (mol/t) (content after retention) in the end-modified polyamide resin. Based on the content of the end structure represented by General Formula (I) [I] (mol/t) (content before retention) and the content of the end structure represented by General Formula (I) [I] (mol/t) (content after retention) measured by the method described above, the content retention rate was calculated as follows: (content after retention/content before retention)×100.

[Weight Reduction Rate]

The end-modified polyamide resin or the polyamide resin obtained by each Example or Comparative Example was dried in a vacuum drier at 80° C. for not less than 12 hours. An arbitrary portion in an amount of 20 mg was excised, and retained using a thermogravimetric analyzer (manufactured by PerkinElmer, Inc.; TGA7) under a nitrogen atmosphere at a temperature of the melting point of the end-modified polyamide resin or the polyamide resin+60° C. for 40 minutes, followed by measurement of the weight reduction rate [%] after the heat treatment.

[Tensile Elongation at Break]

The end-modified polyamide resin or the polyamide resin obtained by each Example or Comparative Example was dried in a vacuum drier at 80° C. for not less than 12 hours. Using an injection molding machine IS55EPN manufactured by TOSHIBA MACHINE CO., LTD, injection molding of an ASTM Type 4 dumbbell evaluation test piece having a test piece thickness of ⅟₂₅ inch (about 1.0 mm) was carried out under the following molding cycle conditions: cylinder temperature, the melting point (Tm) of the end-modified polyamide resin or the polyamide resin+60° C.; mold temperature, 80° C.; total of the injection time and the holding time, 10 seconds; cooling time, 10 seconds. The ASTM Type 4 dumbbell test piece obtained was subjected to "TENSILON" (registered trademark) UTA-2.5T (manufactured by ORIENTEC Co., LTD.), and a tensile test was carried out according to ASTM-D638 at 23° C. in an atmosphere with a humidity of 50% at a strain rate of 10 mm/min. to measure the tensile elongation at break.

[Impregnation Property and Thermal Stability]

The fiber-reinforced polyamide resin base material obtained by each Example or Comparative Example was observed for its cross-section in the thickness direction. A sample in which the fiber-reinforced end-modified polyamide resin is embedded in an epoxy resin was provided, and the sample was ground until a cross-section in the thickness direction of the fiber-reinforced end-modified polyamide resin can be clearly observed. An image of the ground sample was captured at a magnification of ×400 using an ultra-deep color 3D profile measuring microscope VHX-9500 (controller section)/VHZ-100R (measurement section) (manufactured by Keyence Corporation). The image was captured for an area of the thickness of the fiber-reinforced end-modified polyamide resin×500 μm width. In the captured image, the area of the portion occupied by the resin and the area of the void portion were calculated, and the impregnation ratio was calculated according to the following equation.

Impregnation ratio (%)=100×(total area of the portion occupied by the resin)/{(total area of the portion occupied by the resin)+(total area of the void portion)}

In cases where the impregnation property and the thermal stability are high, there is less void, while in cases where at least one of the impregnation property and the thermal stability is low, there is more void. Thus, the impregnation property and the thermal stability of the fiber-reinforced polyamide resin base material were rated on the following 2-point scale using the impregnation ratio as an evaluation criterion. The material was judged as being acceptable when it was rated as "good". The fiber-reinforced polyamide resin base material in the first mode was produced at a processing temperature of the melting point+30° C., 60° C., or 100° C. The fiber-reinforced polyamide resin base material in the second mode was produced at a processing temperature of the melting point+10° C., 20° C., or 30° C.

Good: The impregnation ratio is not less than 98%.

Poor: The impregnation ratio is less than 98%.

[Surface Quality]

The surface quality of the fiber-reinforced end-modified polyamide resin or the fiber-reinforced polyamide resin base material obtained by each Example or Comparative Example was visually observed. The surface quality was evaluated on the following 2-point scale, and judged as being acceptable when it was rated as "good".

Good: The surface shows none of cracking, color change of the matrix resin, and exposure of reinforcing fibers.

Poor: The surface shows cracking, color change of the matrix resin, and/or exposure of reinforcing fibers.

The fiber-reinforced polyamide resin base material in the first mode was produced at a processing temperature of the melting point+30° C., 60° C., or 100° C. The fiber-reinforced polyamide resin base material in the second mode was produced at a processing temperature of the melting point+10° C., 20° C., or 30° C.

[Raw Materials]

In Examples and Comparative Examples, the following raw materials were used. Carbon fiber bundle: T700S-12K, manufactured by Toray Industries, Inc.

ε-Caprolactam: Wako special grade, manufactured by Wako Pure Chemical Industries, Ltd.

Hexamethylenediamine: Wako first grade, manufactured by Wako Pure Chemical Industries, Ltd.

Adipic acid: Wako special grade, manufactured by Wako Pure Chemical Industries, Ltd.

Sebacic acid: Wako first grade, manufactured by Wako Pure Chemical Industries, Ltd.

[Terminal Modification Agents Represented by General Formula (III)]

Methoxypoly(ethylene glycol) poly(propylene glycol) amine represented by the following structural formula (Chemical Formula 1): "JEFFAMINE" (registered trademark) M1000 (number average molecular weight Mn, 1000), manufactured by HUNTSMAN

[Chemical Formula 1]

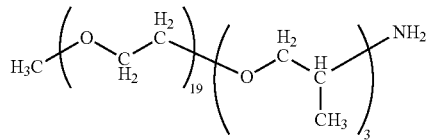

Methoxypoly(ethylene glycol) poly(propylene glycol) amine represented by the following structural formula (Chemical Formula 2): "JEFFAMINE" (registered trademark) M2070 (number average molecular weight Mn, 2000), manufactured by HUNTSMAN

[Chemical Formula 2]

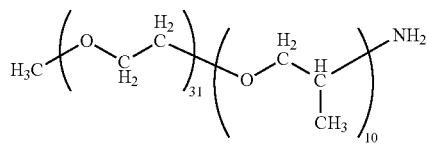

Methoxyethylene glycol poly(propylene glycol) amine represented by the following structural formula (Chemical Formula 3): "JEFFAMINE" (registered trademark) M600 (number average molecular weight Mn, 600), manufactured by HUNTSMAN

[Chemical Formula 3]

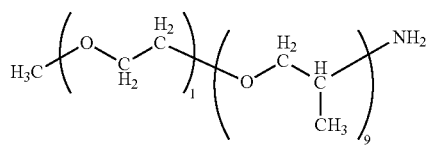

[Terminal Modification Agents Represented by General Formula (IV)]

Benzoic acid: special grade reagent, manufactured by Wako Pure Chemical Industries, Ltd.

Acetic acid: special grade reagent, manufactured by Wako Pure Chemical Industries, Ltd.

Stearic acid: special grade reagent, manufactured by Wako Pure Chemical Industries, Ltd.

Cerotic Acid: manufactured by Tokyo Chemical Industry Co., Ltd.

Example 1

In a reaction vessel, 20 g of ε-caprolactam, 20 g of ion-exchanged water, 1.6 g of "JEFFAMINE" M1000, and 0.14 g of benzoic acid were placed, and the reaction vessel was sealed, followed by nitrogen purge. The temperature of the heater on the circumference of the reaction vessel was set to 290° C. to start heating. After the internal pressure reached 1.0 MPa, the internal pressure was kept at 1.0 MPa while allowing release of moisture to the outside of the system. The temperature was increased until the internal temperature reached 240° C. When the internal temperature reached 240° C., the temperature set for the heater was changed to 270° C., and the internal pressure was controlled such that it decreased to normal pressure for one hour (internal temperature upon reaching to the normal pressure: 243° C.). Subsequently, while allowing nitrogen to flow (nitrogen flow) in the reactor, the materials were retained for 240 minutes to obtain an end-modified polyamide 6 resin (maximum reached temperature: 253° C.). Subsequently, the end-modified polyamide 6 resin obtained was subjected to Soxhlet extraction with ion-exchanged water to remove unreacted terminal modification agents. The thus obtained end-modified polyamide 6 resin had a relative viscosity of 1.81, weight average molecular weight of 30,000, melting point (Tm) of 220° C., and melt viscosity of 5.5 Pa·s. The end-modified polyamide 6 resin obtained contained an end-modified polyamide 6 resin having at its ends the structure represented by the following Chemical Formula 4 and the structure represented by the following Chemical Formula 5. Other physical properties were as shown in Table 1.

[Chemical Formula 4]

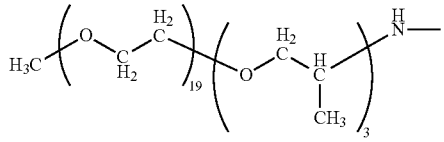

[Chemical Formula 5]

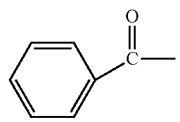

Sixteen bobbins with carbon fiber bundles wound therearound were provided, and from each bobbin, a carbon fiber bundle was continuously sent through a yarn guide. In an impregnation die, the carbon fiber bundle continuously sent was impregnated with an end-modified polyamide 6 resin obtained by the above method that was quantitatively supplied from a filled feeder. The carbon fiber impregnated with the end-modified polyamide 6 resin in the impregnation die was continuously drawn from a nozzle of the impregnation die using a take-up roll at a drawing rate of 1 m/min. The temperature during the drawing of the carbon fiber is referred to as the processing temperature. The drawn carbon fiber bundle was passed through a cooling roll to cool and solidify the end-modified polyamide 6 resin, and taken into a winder as a continuous fiber-reinforced polyamide resin base material. The obtained fiber-reinforced polyamide resin base material had a thickness of 0.3 mm and a width of 50 mm, contained reinforcing fibers aligned in one direction, and had a volume content of 50%. The obtained fiber-reinforced polyamide resin base material was subjected to the evaluations described above. The evaluation results were as shown in Table 1.

Examples 2 to 39, Comparative Examples 1 to 3

End-modified polyamide 6 resins were obtained in the same manner as in Example 1 except that the compositions shown in Tables 1 to 5 were used as raw materials, and that the time of retention of the materials in the reactor under nitrogen flow (nitrogen flow time) after the internal pressure became normal pressure was as shown in Tables 1 to 5. Fiber-reinforced polyamide resin base materials were obtained in the same manner as in Example 1 except that the end-modified polyamide 6 resin or the polyamide 6 resin obtained by each Example or Comparative Example was used instead of the end-modified polyamide 6 resin obtained by Example 1. The physical properties of the end-modified polyamide 6 resins obtained and the physical properties of the fiber-reinforced polyamide resin base materials were as shown in Tables 1 to 5.

Example 40

In a reaction vessel, 9.46 g of hexamethylenediamine, 11.92 g of adipic acid, 20 g of ion-exchanged water, 1.6 g of "JEFFAMINE" (registered trademark) M1000, and 0.14 g of benzoic acid were placed, and the reaction vessel was sealed, followed by nitrogen purge. The temperature of the heater on the circumference of the reaction vessel was set to 290° C. to start heating. After the internal pressure reached 1.75 MPa, the internal pressure was kept at 1.75 MPa while allowing release of moisture to the outside of the system. The temperature was increased until the internal temperature reached 260° C. When the internal temperature reached 260° C., the temperature set for the heater was changed to 290° C., and the internal pressure was controlled such that it decreased to normal pressure for one hour (internal temperature upon reaching to normal pressure: 270° C.). Subsequently, while allowing nitrogen to flow (nitrogen flow) in the reactor, the materials were retained for 240 minutes to obtain an end-modified polyamide 66 resin (maximum reached temperature: 275° C.). The polyamide resin obtained contained an end-modified polyamide 66 resin having at its ends the structures shown in Example 1.

Using the end-modified polyamide 66 resin obtained, a fiber-reinforced polyamide 66 resin base material was obtained in the same manner as in Example 1 except that the processing temperature was 320° C. The physical properties of the end-modified polyamide 66 resin obtained and the physical properties of the fiber-reinforced polyamide 66 resin base material were as shown in Table 6.

Example 41

In a reaction vessel, 7.74 g of hexamethylenediamine, 13.46 g of sebacic acid, 20 g of ion-exchanged water, 1.6 g of "JEFFAMINE" (registered trademark) M1000, and 0.14 g of benzoic acid were placed, and the reaction vessel was sealed, followed by nitrogen purge. The temperature of the heater on the circumference of the reaction vessel was set to 290° C. to start heating. After the internal pressure reached 1.0 MPa, the internal pressure was kept at 1.0 MPa while allowing release of moisture to the outside of the system. The temperature was increased until the internal temperature reached 240° C. When the internal temperature reached 240° C., the temperature set for the heater was changed to 290° C., and the internal pressure was controlled such that it decreased to normal pressure for one hour (internal temperature upon reaching to the normal pressure: 243° C.). Subsequently, while allowing nitrogen to flow (nitrogen flow) in the reactor, the materials were retained for 240 minutes to obtain an end-modified polyamide 610 resin (maximum reached temperature: 253° C.). The polyamide resin obtained contained an end-modified polyamide 610 resin having at its ends the structures shown in Example 1.

Using the end-modified polyamide 610 resin obtained, a fiber-reinforced polyamide 610 resin base material was obtained in the same manner as in Example 1 except that the processing temperature was 280° C. The physical properties of the end-modified polyamide 610 resin obtained and the physical properties of the fiber-reinforced polyamide 610 resin base material were as shown in Table 6.

Example 42

In the same manner as in Example 1, an end-modified polyamide resin was obtained. The end-modified polyamide resin obtained was fed into an extruder and melt-kneaded, and then extruded from a film die into a film shape, to obtain a resin film.

The carbon fiber used as the reinforcing fiber was cut into a fiber length of 15 mm, and fed into an air-laid machine, to obtain a mat-shaped reinforcing fiber base material having a basis weight of 100 g/m$^2$.

After laminating the reinforcing fiber base material with the resin film such that the content of the carbon fiber became 30% by volume and the thickness became 1.0 mm, the resultant was fed into a mold that was heated to a mold temperature (processing temperature) of 250° C. Subsequently, heat pressure pressing was carried out at a pressure of 3 MPa for 10 minutes, and then cool pressing was carried out at a pressure of 3 MPa to obtain a fiber-reinforced polyamide resin base material having a volume content of 30%. The obtained fiber-reinforced polyamide resin base material was subjected to the evaluations described above. The evaluation results were as shown in Table 7.

Examples 43 to 80, Comparative Examples 4 to 6

End-modified polyamide 6 resins were obtained in the same manner as in Example 40 except that the compositions shown in Tables 7 to 11 were used as raw materials, and that the time of retention of the materials in the reactor under nitrogen flow (nitrogen flow time) after the internal pressure became normal pressure was as shown in Tables 7 to 11. Fiber-reinforced polyamide resin base materials were obtained in the same manner as in Example 42 except that the end-modified polyamide 6 resin or the polyamide 6 resin obtained by each Example or Comparative Example was used instead of the end-modified polyamide 6 resin obtained by Example 42. The physical properties of the end-modified polyamide 6 resins obtained and the physical properties of the fiber-reinforced polyamide resin base materials were as shown in Tables 7 to 11.

Example 81

In the same manner as in Example 40, an end-modified polyamide 66 resin was obtained. Using the end-modified polyamide 610 resin obtained, a fiber-reinforced polyamide 610 resin base material was obtained in the same manner as in Example 42 except that the processing temperature was 290° C. The physical properties of the end-modified polyamide 610 resin obtained and the physical properties of the fiber-reinforced polyamide 610 resin base material were as shown in Table 12.

Example 82

In the same manner as in Example 41, an end-modified polyamide 610 resin was obtained. Using the end-modified polyamide 610 resin obtained, a fiber-reinforced polyamide 610 resin base material was obtained in the same manner as in Example 42 except that the processing temperature was 250° C. The physical properties of the end-modified polyamide 610 resin obtained and the physical properties of the fiber-reinforced polyamide 610 resin base material were as shown in Table 12.

The end-modified polyamide resins obtained by Examples 10 to 12 and 51 to 53 contained an end-modified polyamide having at its ends the structure represented by the Chemical Formula 6 and the structure represented by the Chemical Formula 5 described below.

[Chemical Formula 6]

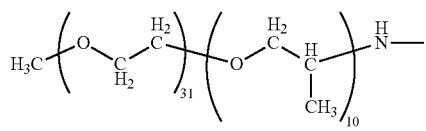

[Chemical Formula 5]

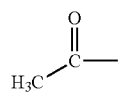

The end-modified polyamide resins obtained by Examples 13 and 54 contained an end-modified polyamide having at its ends the structure represented by the Chemical Formula 7 and the structure represented by the Chemical Formula 5 described below.

[Chemical Formula 7]

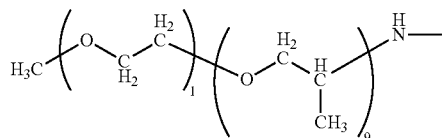

[Chemical Formula 5]

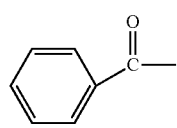

The end-modified polyamide resins obtained by Examples 30 and 71 contained an end-modified polyamide having at its end the structure represented by the Chemical Formula 4 described below.

[Chemical Formula 4]

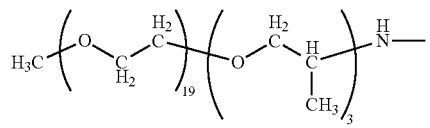

The end-modified polyamide resins obtained by Examples 31 and 72 contained an end-modified polyamide having at its ends the structure represented by the Chemical Formula 4 and the structure represented by the Chemical Formula 8 described below.

[Chemical Formula 4]

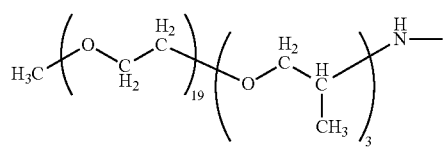

[Chemical Formula 8]

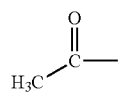

The end-modified polyamide resins obtained by Examples 32, 33, 73, and 74 contained an end-modified polyamide having at its ends the structure represented by the Chemical Formula 4 and the structure represented by the Chemical Formula 9 described below.

[Chemical Formula 4]

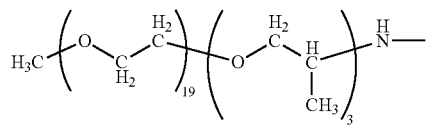

[Chemical Formula 9]

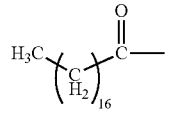

The end-modified polyamide resins obtained by Examples 34 and 75 contained an end-modified polyamide having at its ends the structure represented by the Chemical Formula 4 and the structure represented by the Chemical Formula 10 described below.

[Chemical Formula 4]

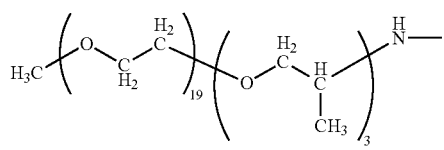

[Chemical Formula 10]

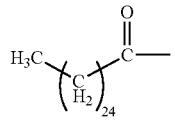

[Chemical Formula 6]

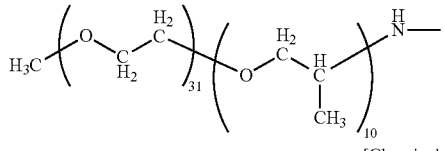

[Chemical Formula 10]

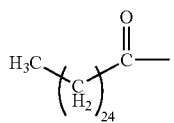

The end-modified polyamide resins obtained by Examples 35 and 76 contained an end-modified polyamide having at its ends the structure represented by the Chemical Formula 6 and the structure represented by the Chemical Formula 10 described below.

The end-modified polyamide resins obtained by Examples 1 to 9, 14 to 29, 36 to 50, 55 to 70, and 77 to 82 contained an end-modified polyamide having at its ends the structures shown in Example 1.

The polyamide resins obtained by Comparative Examples 1 to 3 and 4 to 6 did not contain an end-modified polyamide.

TABLE 1

|  |  |  |  | Example 1 | Example 2 | Example 3 | Example 4 | Example 5 |
|---|---|---|---|---|---|---|---|---|
| Raw Materials | ε-caprolactam |  | g | 20 | 20 | 20 | 20 | 20 |
|  | "JEFFAMINE" M1000 |  | g | 1.6 | 2.1 | 0.5 | 1.0 | 1.3 |
|  | "JEFFAMINE" M2070 |  | g | — | — | — | — | — |
|  | "JEFFAMINE" M600 |  | g | — | — | — | — | — |
|  | Benzoic acid |  | g | 0.14 | 0.14 | 0.14 | 0.14 | 0.14 |
|  | Ion-exchange water |  | g | 20 | 20 | 20 | 20 | 20 |
|  | CF (T700S-12K) |  | volume % | 50 | 50 | 50 | 50 | 50 |
|  | Nitrogen Flow time |  | min | 240 | 240 | 150 | 180 | 210 |
| Polymer Properties | End Structure | [I] | mass % | 6.7 | 8.8 | 2.3 | 4.1 | 5.3 |
|  | Amount | [II] | mass % | 0.48 | 0.46 | 0.49 | 0.48 | 0.48 |
|  |  | [I] | mol/t | 67 | 88 | 24 | 41 | 53 |
|  |  | [II] | mol/t | 46 | 44 | 47 | 46 | 46 |
|  | Total Mole [I] + [II] |  | mol/t | 113 | 132 | 71 | 87 | 99 |
|  | Mole Ratio [I]/[II] |  | — | 1.47 | 2.02 | 0.51 | 0.90 | 1.16 |
|  | [NH$_2$] |  | mol/t | 73 | 91 | 60 | 66 | 70 |
|  | [COOH] |  | mol/t | 44 | 54 | 88 | 69 | 59 |
|  | Total Mole [NH$_2$][COOH] |  | mol/t | 117 | 145 | 148 | 135 | 129 |
|  | Mole Ratio [NH$_2$]/[COOH] |  | — | 1.66 | 1.69 | 0.68 | 0.96 | 1.19 |
|  | Melting Point (Tm) |  | ° C. | 220 | 220 | 220 | 220 | 220 |
|  | η$_r$ |  | — | 1.81 | 1.63 | 2.09 | 1.98 | 1.87 |
|  | Weight Average Molecular Weight (Mw) |  |  | 30,000 | 24,000 | 30,000 | 30,000 | 30,000 |
|  | Number Average Molecular Weight (Mn) |  |  | 15,000 | 14,000 | 15,000 | 15,000 | 15,000 |
|  | Melt Viscosity |  | Pa · s | 5.5 | 2.9 | 14.8 | 11.7 | 8.9 |
| Termal Stability during Melt Retention | Content Retention Rate |  | % | 92 | 90 | 93 | 93 | 93 |
|  | Melt Viscosity Retention Rate |  | % | 104 | 109 | 107 | 108 | 106 |
|  | Weight Average Molecular Weight Retention Rate |  | % | 107 | 109 | 107 | 105 | 109 |
|  | Weight Reduction Rate |  | % | 2.4 | 2.7 | 2.7 | 2.4 | 2.5 |
| Mechanical Property | Tensile Elongation at Break |  | % | >200 | >200 | >200 | >200 | >200 |
| Impregnation Property | Melting Point (Tm) + 30° C. |  | — | good | good | bad | bad | good |
|  | Melting Point (Tm) + 60° C. |  | — | good | good | good | good | good |
|  | Melting Point (Tm) + 100° C. |  | — | good | good | good | good | good |
| Surface Quality | Melting Point (Tm) + 30° C. |  | — | good | good | bad | bad | good |
|  | Melting Point (Tm) + 60° C. |  | — | good | good | good | good | good |

TABLE 1-continued

| | | | | | | | |
|---|---|---|---|---|---|---|---|
| Melting Point (Tm) + 100° C. | | | — | good | good | good | good | good |

| | | | | Example 6 | Example 7 | Example 8 | Example 9 |
|---|---|---|---|---|---|---|---|
| Raw Materials | ε-caprolactam | | g | 20 | 20 | 20 | 20 |
| | "JEFFAMINE" M1000 | | g | 1.3 | 1.3 | 1.3 | 2.7 |
| | "JEFFAMINE" M2070 | | g | — | — | — | — |
| | "JEFFAMINE" M600 | | g | — | — | — | — |
| | Benzoic acid | | g | 0.14 | 0.14 | 0.07 | 0.35 |
| | Ion-exchange water | | g | 20 | 20 | 20 | 20 |
| | CF (T700S-12K) | | volume % | 50 | 50 | 50 | 50 |
| | Nitrogen Flow time | | min | 360 | 300 | 180 | 240 |
| Polymer Properties | End Structure Amount | [I] | mass % | 5.3 | 5.3 | 5.3 | 11.5 |
| | | [II] | mass % | 0.48 | 0.48 | 0.24 | 1.19 |
| | | [I] | mol/t | 53 | 53 | 53 | 115 |
| | | [II] | mol/t | 46 | 46 | 23 | 113 |
| | Total Mole [I] + II] | | mol/t | 99 | 99 | 76 | 228 |
| | Mole Ratio [I]/[II] | | — | 1.16 | 1.16 | 2.32 | 1.02 |
| | [NH$_2$] | | mol/t | 31 | 40 | 90 | 72 |
| | [COOH] | | mol/t | 22 | 29 | 59 | 70 |
| | Total Mole [NH$_2$][COOH] | | mol/t | 53 | 69 | 149 | 142 |
| | Mole Ratio [NH$_2$]/[COOH] | | — | 1.41 | 1.38 | 1.53 | 1.03 |
| | Melting Point (Tm) | | ° C. | 220 | 220 | 220 | 219 |
| | η$_r$ | | — | 2.58 | 2.05 | 1.85 | 1.23 |
| | Weight Average Molecular Weight (Mw) | | | 56,000 | 43,000 | 30,000 | 17,000 |
| | Number Average Molecular Weight (Mn) | | | 25,000 | 21,000 | 15,000 | 8,000 |
| | Melt Viscosity | | Pa·s | 19.7 | 13.7 | 8.7 | 1.9 |
| Termal Stability during Melt Retention | Content Retention Rate | | % | 96 | 94 | 89 | 91 |
| | Melt Viscosity Retention Rate | | % | 106 | 106 | 109 | 108 |
| | Weight Average Molecular Weight Retention Rate | | % | 109 | 109 | 109 | 106 |
| | Weight Reduction Rate | | % | 2.5 | 2.4 | 2.8 | 2.8 |
| Mechanical Property | Tensile Elongation at Break | | % | >200 | >200 | >200 | 105 |
| Impregnation Property | Melting Point (Tm) + 30° C. | | — | bad | bad | good | good |
| | Melting Point (Tm) + 60° C. | | — | bad | good | good | good |
| | Melting Point (Tm) + 100° C. | | — | good | good | good | good |
| Surface Quality | Melting Point (Tm) + 30° C. | | — | bad | bad | good | good |
| | Melting Point (Tm) + 60° C. | | — | bad | good | good | good |
| | Melting Point (Tm) + 100° C. | | — | good | good | good | good |

TABLE 2

| | | | | Example 10 | Example 11 | Example 12 | Example 13 | Example 14 | Example 15 |
|---|---|---|---|---|---|---|---|---|---|
| Raw Materials | ε-caprolactam | | g | 20 | 20 | 20 | 20 | 20 | 20 |
| | "JEFFAMINE" M1000 | | g | — | — | — | — | 3.1 | 3.1 |
| | "JEFFAMINE" M2070 | | g | 1.6 | 2.4 | 3.5 | — | — | — |
| | "JEFFAMINE" M600 | | g | — | — | — | 1.6 | — | — |
| | Benzoic acid | | g | 0.14 | 0.14 | 0.14 | 0.21 | 0.41 | 0.41 |
| | Ion-exchange water | | g | 20 | 20 | 20 | 20 | 20 | 20 |
| | CF (T700S-12K) | | volume % | 50 | 50 | 50 | 50 | 50 | 50 |
| | Nitrogen Flow time | | min | 240 | 270 | 300 | 240 | 360 | 360 |
| Polymer Properties | End Structure Amount | [I] | mass % | 6.7 | 10.6 | 15.2 | 6.7 | 13 | 13 |
| | | [II] | mass % | 0.49 | 0.49 | 0.49 | 0.73 | 1.42 | 1.42 |
| | | [I] | mol/t | 37 | 53 | 76 | 91 | 130 | 130 |
| | | [II] | mol/t | 47 | 47 | 47 | 70 | 135 | 135 |
| | Total Mole [I] + [II] | | mol/t | 84 | 100 | 123 | 161 | 265 | 265 |

TABLE 2-continued

|  |  |  |  |  |  |  |  |  |
|---|---|---|---|---|---|---|---|---|
|  | Mole Ratio [I]/[II] | — | 0.79 | 1.13 | 1.63 | 1.31 | 0.96 | 0.96 |
|  | [NH$_2$] | mol/t | 74 | 67 | 67 | 39 | 65 | 10 |
|  | [COOH] | mol/t | 75 | 59 | 35 | 19 | 65 | 10 |
|  | Total Mole [NH$_2$][COOH] | mol/t | 149 | 126 | 102 | 58 | 130 | 20 |
|  | Mole Ratio [NH$_2$]/[COOH] | — | 0.99 | 1.14 | 1.91 | 2.05 | 1.00 | 1.00 |
|  | Melting Point (Tm) | °C. | 220 | 218 | 217 | 220 | 219 | 219 |
|  | η$_r$ | — | 1.96 | 1.43 | 1.29 | 1.92 | 1.18 | 1.34 |
|  | Weight Average Molecular Weight (Mw) |  | 30,000 | 30,000 | 30,000 | 30,000 | 17,000 | 24,000 |
|  | Number Average Molecular Weight (Mn) |  | 15,000 | 15,000 | 15,000 | 15,000 | 9,000 | 12,000 |
|  | Melt Viscosity | Pa · s | 9.7 | 6.1 | 3.1 | 10.2 | 1.6 | 2.2 |
| Thermal Stability during Melt Retention | Content Retention Rate | % | 94 | 89 | 86 | 91 | 81 | 83 |
|  | Melt Viscosity Retention Rate | % | 105 | 105 | 105 | 105 | 132 | 121 |
|  | Weight Average Molecular Weight Retention Rate | % | 109 | 109 | 109 | 109 | 106 | 81 |
|  | Weight Reduction Rate | % | 2.8 | 3.0 | 3.3 | 2.8 | 3.9 | 3.6 |
| Mechanical Property | Tensile Elongation at Break | % | >200 | >200 | 175 | >200 | 75 | 120 |
| Impregnation Property | Melting Point (Tm) + 30° C. | — | good | good | good | bad | good | good |
|  | Melting Point (Tm) + 60° C. | — | good | good | good | good | good | good |
|  | Melting Point (Tm) + 100° C. | — | good | good | good | good | good | good |
| Surface Quality | Melting Point (Tm) + 30° C. | — | good | good | good | bad | good | good |
|  | Melting Point (Tm) + 60° C. | — | good | good | good | good | good | good |
|  | Melting Point (Tm) + 100° C. | — | good | good | good | good | good | good |

|  |  |  | Example 16 | Example 17 | Example 18 | Example 19 | Example 20 | Example 21 |
|---|---|---|---|---|---|---|---|---|
| Raw Materials | ε-caprolactam | g | 20 | 20 | 20 | 20 | 20 | 20 |
|  | "JEFFAMINE" M1000 | g | 0.3 | 2.1 | 1.9 | 1.9 | 0.5 | 0.5 |
|  | "JEFFAMINE" M2070 | g | — | — | — | — | — | — |
|  | "JEFFAMINE" M600 | g | — | — | — | — | — | — |
|  | Benzoic acid | g | 0.04 | 0.08 | 0.08 | 0.08 | 0.29 | 0.29 |
|  | Ion-exchange water | g | 20 | 20 | 20 | 20 | 20 | 20 |
|  | CF (T700S-12K) | volume % | 50 | 50 | 50 | 50 | 50 | 50 |
|  | Nitrogen Flow time | min | 60 | 180 | 210 | 150 | 360 | 300 |
| Polymer Properties | End Structure Amount | [I] | 13 | 1.1 | 8.6 | 8.1 | 8.6 | 2.0 | 2.0 |
|  |  | [II] | 1.42 | 0.12 | 0.26 | 0.26 | 0.26 | 0.98 | 0.99 |
|  |  | [I] | 130 | 11 | 86 | 81 | 81 | 20 | 20 |
|  |  | [II] | 135 | 11 | 25 | 25 | 25 | 94 | 95 |
|  | Total Mole [I] + [II] | mol/t | 22 | 111 | 106 | 106 | 114 | 115 |
|  | Mole Ratio [I]/[II] | — | 0.96 | 3.45 | 3.25 | 3.25 | 0.21 | 0.21 |
|  | [NH$_2$] | mol/t | 98 | 97 | 86 | 104 | 24 | 58 |
|  | [COOH] | mol/t | 99 | 50 | 29 | 55 | 92 | 118 |
|  | Total Mole [NH$_2$][COOH] | mol/t | 197 | 147 | 115 | 159 | 116 | 176 |
|  | Mole Ratio [NH$_2$]/[COOH] | — | 0.99 | 1.94 | 2.97 | 1.89 | 0.26 | 0.49 |
|  | Melting Point (Tm) | °C. | 218 | 221 | 221 | 221 | 219 | 219 |
|  | η$_r$ | — | 2.04 | 1.54 | 1.71 | 1.48 | 1.99 | 1.79 |
|  | Weight Average Molecular Weight (Mw) |  | 30,000 | 24,000 | 30,000 | 24,000 | 30,000 | 24,000 |
|  | Number Average Molecular Weight (Mn) |  | 15,000 | 12,000 | 15,000 | 12,000 | 15,000 | 12,000 |
|  | Melt Viscosity | Pa · s | 19.6 | 2.9 | 4.6 | 3.6 | 16.7 | 12.7 |
| Thermal Stability during Melt Retention | Content Retention Rate | % | 82 | 84 | 81 | 81 | 84 | 81 |
|  | Melt Viscosity Retention Rate | % | 119 | 117 | 117 | 117 | 113 | 118 |
|  | Weight Average Molecular Weight Retention Rate | % | 117 | 108 | 84 | 119 | 84 | 116 |
|  | Weight Reduction Rate | % | 3.7 | 3.6 | 3.7 | 3.8 | 3.5 | 3.8 |
| Mechanical Property | Tensile Elongation at Break | % | 140 | 105 | 150 | 120 | 175 | 105 |
| Impregnation Property | Melting Point (Tm) + 30° C. | — | bad | good | good | good | bad | bad |
|  | Melting Point (Tm) + 60° C. | — | bad | good | good | good | bad | good |
|  | Melting Point (Tm) + 100° C. | — | good | good | good | good | good | good |
| Surface Quality | Melting Point (Tm) + 30° C. | — | bad | good | good | good | bad | bad |
|  | Melting Point (Tm) + 60° C. | — | bad | good | good | good | bad | good |
|  | Melting Point (Tm) + 100° C. | — | good | good | good | good | good | good |

TABLE 3

|  |  |  | Example 22 | Example 23 | Example 24 | Example 25 | Example 26 |
|---|---|---|---|---|---|---|---|
| Raw Materials | ε-caprolactam | g | 20 | 20 | 20 | 20 | 20 |
|  | "JEFFAMINE" M1000 | g | 1.3 | 1.6 | 1.0 | 1.0 | 2.2 |
|  | "JEFFAMINE" M2070 | g | — | — | — | — | — |

TABLE 3-continued

|  |  |  |  |  |  |  |  |
|---|---|---|---|---|---|---|---|
|  | "JEFFAMINE" M600 | g | — | — | — | — | — |
|  | Benzoic acid | g | 0.18 | 0.14 | 0.25 | 0.25 | 0.14 |
|  | Ion-exchange water | g | 20 | 20 | 20 | 20 | 20 |
|  | CF (T700S-12K) | volume % | 50 | 50 | 50 | 50 | 50 |
|  | Nitrogen Flow time | min | 360 | 180 | 240 | 120 | 300 |
| Polymer Properties | End Structure Amount [I] | mass % | 5.3 | 6.7 | 4.1 | 4.1 | 9.1 |
|  | [II] | mass % | 0.60 | 0.44 | 0.87 | 0.87 | 0.44 |
|  | [I] | mol/t | 53 | 67 | 41 | 41 | 91 |
|  | [II] | mol/t | 57 | 42 | 80 | 80 | 42 |
|  | Total Mole [I] + [II] | mol/t | 110 | 109 | 121 | 121 | 133 |
|  | Mole Ratio [I]/[II] | — | 0.93 | 1.61 | 0.51 | 0.51 | 2.19 |
|  | [NH$_2$] | mol/t | 22 | 100 | 25 | 70 | 71 |
|  | [COOH] | mol/t | 24 | 70 | 70 | 100 | 21 |
|  | Total Mole [NH$_2$]/[COOH] | mol/t | 46 | 170 | 95 | 170 | 92 |
|  | Mole Ratio [NH$_2$]/[COOH] | — | 0.92 | 1.43 | 0.36 | 0.70 | 3.38 |
|  | Melting Point (Tm) | °C. | 220 | 220 | 220 | 221 | 220 |
|  | η$_r$ | — | 2.04 | 1.68 | 1.92 | 1.76 | 1.61 |
|  | Weight Average Molecular Weight (Mw) |  | 43,000 | 24,000 | 30,000 | 24,000 | 30,000 |
|  | Number Average Molecular Weight (Mn) |  | 22,000 | 12,000 | 15,000 | 12,000 | 15,000 |
|  | Melt Viscosity | Pa·s | 14.8 | 4.5 | 9.0 | 7.1 | 4.0 |
| Termal Stability during Melt Retention | Content Retention Rate | % | 93 | 87 | 88 | 87 | 87 |
|  | Melt Viscosity Retention Rate | % | 88 | 114 | 112 | 114 | 113 |
|  | Weight Average Molecular Weight Retention Rate | % | 86 | 113 | 89 | 114 | 88 |
|  | Weight Reduction Rate | % | 2.1 | 3.3 | 3.3 | 3.4 | 3.2 |
| Mechanical Property | Tensile Elongation at Break | % | >200 | 175 | 190 | 150 | 190 |
| Impregnation Property | Melting Point (Tm) + 30° C. | — | bad | good | good | good | good |
|  | Melting Point (Tm) + 60° C. | — | bad | good | good | good | good |
|  | Melting Point (Tm) + 100° C. | — | good | good | good | good | good |
| Surface Quality | Melting Point (Tm) + 30° C. | — | bad | good | good | good | good |
|  | Melting Point (Tm) + 60° C. | — | bad | good | good | good | good |
|  | Melting Point (Tm) + 100° C. | — | good | good | good | good | good |

|  |  |  | Example 27 | Example 28 | Example 29 | Example 30 |
|---|---|---|---|---|---|---|
| Raw Materials | ε-caprolactam | g | 20 | 20 | 20 | 20 |
|  | "JEFFAMINE" M1000 | g | 6.0 | 1.6 | 1.6 | 1.6 |
|  | "JEFFAMINE" M2070 | g | — | — | — | — |
|  | "JEFFAMINE" M600 | g | — | — | — | — |
|  | Benzoic acid | g | 0.14 | 0.01 | 1.62 | 0.00 |
|  | Ion-exchange water | g | 20 | 20 | 20 | 20 |
|  | CF (T700S-12K) | volume % | 50 | 50 | 50 | 50 |
|  | Nitrogen Flow time | min | 240 | 180 | 240 | 240 |
| Polymer Properties | End Structure Amount [I] | mass % | 25 | 6.7 | 6.7 | 6.8 |
|  | [II] | mass % | 0.44 | 0.04 | 5.56 | 0.00 |
|  | [I] | mol/t | 250 | 67 | 67 | 68 |
|  | [II] | mol/t | 42 | 4 | 530 | 0 |
|  | Total Mole [I] + [II] | mol/t | 292 | 71 | 597 | 68 |
|  | Mole Ratio [I]/[II] | — | 6.02 | 16.12 | 0.13 | — |
|  | [NH$_2$] | mol/t | 230 | 110 | 20 | 114 |
|  | [COOH] | mol/t | 20 | 44 | 420 | 42 |
|  | Total Mole [NH$_2$]/[COOH] | mol/t | 250 | 154 | 440 | 156 |
|  | Mole Ratio [NH$_2$]/[COOH] | — | 11.50 | 2.50 | 0.05 | 2.71 |
|  | Melting Point (Tm) | °C. | 217 | 220 | 215 | 220 |
|  | η$_r$ | — | 1.22 | 1.83 | 1.07 | 1.83 |
|  | Weight Average Molecular Weight (Mw) |  | 12,000 | 30,000 | 7,000 | 30,000 |
|  | Number Average Molecular Weight (Mn) |  | 6,000 | 15,000 | 3,000 | 15,000 |
|  | Melt Viscosity | Pa·s | 0.6 | 5.5 | 1.3 | 5.5 |
| Termal Stability during Melt Retention | Content Retention Rate | % | 68 | 78 | 54 | 72 |
|  | Melt Viscosity Retention Rate | % | 183 | 154 | 304 | 171 |
|  | Weight Average Molecular Weight Retention Rate | % | 105 | 110 | 109 | 114 |
|  | Weight Reduction Rate | % | 7.2 | 4.5 | 9.6 | 5.2 |
| Mechanical Property | Tensile Elongation at Break | % | 15 | 95 | 3 | 90 |
| Impregnation Property | Melting Point (Tm) + 30° C. | — | good | good | good | good |
|  | Melting Point (Tm) + 60° C. | — | good | good | good | good |
|  | Melting Point (Tm) + 100° C. | — | good | good | good | good |
| Surface | Melting Point (Tm) + 30° C. | — | good | good | good | good |

TABLE 3-continued

|  |  |  |  |  |  |  |
|---|---|---|---|---|---|---|
| Quality | Melting Point (Tm) + 60° C. | — | good | good | good | good |
|  | Melting Point (Tm) + 100° C. | — | good | good | good | good |

TABLE 4

|  |  |  | Example 31 | Example 32 | Example 33 | Example 34 | Example 35 |
|---|---|---|---|---|---|---|---|
| Raw Materials | ε-caprolactam | g | 20 | 20 | 20 | 20 | 20 |
|  | "JEFFAMINE" M1000 | g | 1.6 | 1.6 | 1.6 | 1.6 | — |
|  | "JEFFAMINE" M2070 | g | — | — | — | — | 3.5 |
|  | "JEFFAMINE" M600 | g | — | — | — | — | — |
|  | Benzoic acid | g | — | — | — | — | — |
|  | Acetic acid | g | 0.07 | — | — | — | — |
|  | Stearic acid | g | — | 0.32 | 0.81 | — | — |
|  | Cerotic acid | g | — | — | — | 1.14 | 1.14 |
|  | Ion-exchange water | g | 20 | 20 | 20 | 20 | 20 |
|  | CF (T700S-12K) | volume % | 50 | 50 | 50 | 50 | 50 |
|  | Nitrogen Flow time | min | 200 | 260 | 300 | 300 | 300 |
| Polymer Properties | End Structure Amount [I] | mass % | 6.7 | 6.7 | 6.7 | 6.7 | 15.2 |
|  | [II] | mass % | 0.24 | 0.55 | 2.74 | 3.87 | 3.87 |
|  | [I] | mol/t | 67 | 67 | 67 | 67 | 76 |
|  | [II] | mol/t | 46 | 46 | 113 | 113 | 112 |
|  | Total Mole [I] + [II] | mol/t | 113 | 113 | 180 | 180 | 188 |
|  | Mole Ratio [I]/[II] | — | 1.47 | 1.46 | 0.59 | 0.59 | 0.68 |
|  | [NH$_2$] | mol/t | 74 | 73 | 35 | 35 | 32 |
|  | [COOH] | mol/t | 44 | 44 | 69 | 70 | 61 |
|  | Total Mole [NH$_2$][COOH] | mol/t | 118 | 117 | 104 | 105 | 93 |
|  | Mole Ratio [NH$_2$]/[COOH] | — | 1.68 | 1.66 | 0.51 | 0.50 | 0.52 |
|  | Melting Point (Tm) | ° C. | 220 | 220 | 220 | 220 | 220 |
|  | η$_r$ | — | 1.82 | 1.81 | 1.64 | 1.63 | 1.64 |
|  | Weight Average Molecular Weight (Mw) |  | 30,000 | 30,000 | 24,000 | 24,000 | 24,000 |
|  | Number Average Molecular Weight (Mn) |  | 15,000 | 15,000 | 12,000 | 12,000 | 12,000 |
|  | Melt Viscosity | Pa · s | 5.1 | 5.7 | 2.9 | 3.1 | 3.1 |
| Termal Stability during Melt Retention | Content Retention Rate | % | 93 | 92 | 90 | 90 | 90 |
|  | Melt Viscosity Retention Rate | % | 103 | 105 | 109 | 109 | 109 |
|  | Weight Average Molecular Weight Retention Rate | % | 106 | 108 | 109 | 109 | 109 |
|  | Weight Reduction Rate | % | 2.3 | 2.5 | 2.7 | 2.7 | 2.7 |
| Mechanical Property | Tensile Elongation at Break | % | >200 | >200 | >200 | >200 | 160 |
| Impregnation Property | Melting Point (Tm) + 30° C. | — | good | good | good | good | good |
|  | Melting Point (Tm) + 60° C. | — | good | good | good | good | good |
|  | Melting Point (Tm) + 100° C. | — | good | good | good | good | good |
| Surface Quality | Melting Point (Tm) + 30° C. | — | good | good | good | good | good |
|  | Melting Point (Tm) + 60° C. | — | good | good | good | good | good |
|  | Melting Point (Tm) + 100° C. | — | good | good | good | good | good |

|  |  |  | Example 36 | Example 37 | Example 38 | Example 39 |
|---|---|---|---|---|---|---|
| Raw Materials | ε-caprolactam | g | 20 | 20 | 20 | 20 |
|  | "JEFFAMINE" M1000 | g | 0.6 | 0.4 | 3.1 | 3.1 |
|  | "JEFFAMINE" M2070 | g | — | — | — | — |
|  | "JEFFAMINE" M600 | g | — | — | — | — |
|  | Benzoic acid | g | 0.08 | 0.06 | 0.15 | 0.14 |
|  | Acetic acid | g | — | — | — | — |
|  | Stearic acid | g | — | — | — | — |
|  | Cerotic acid | g | — | — | — | — |
|  | Ion-exchange water | g | 20 | 20 | 20 | 20 |
|  | CF (T700S-12K) | volume % | 50 | 50 | 50 | 50 |
|  | Nitrogen Flow time | min | 180 | 180 | 360 | 360 |
| Polymer Properties | End Structure Amount [I] | mass % | 2.5 | 1.7 | 13 | 13 |
|  | [II] | mass % | 0.26 | 0.19 | 1.42 | 1.42 |
|  | [I] | mol/t | 25 | 17 | 130 | 130 |
|  | [II] | mol/t | 25 | 18 | 48 | 44 |
|  | Total Mole [I] + [II] | mol/t | 50 | 35 | 178 | 174 |
|  | Mole Ratio [I]/[II] | — | 1.00 | 0.94 | 2.71 | 2.95 |
|  | [NH$_2$] | mol/t | 88 | 96 | 13 | 13 |
|  | [COOH] | mol/t | 87 | 93 | 96 | 100 |
|  | Total Mole [NH$_2$][COOH] | mol/t | 175 | 189 | 109 | 113 |

TABLE 4-continued

|  |  |  |  |  |  |  |
|---|---|---|---|---|---|---|
|  |  | Mole Ratio [NH$_2$]/[COOH] | — | 1.01 | 1.03 | 0.14 | 0.13 |
|  |  | Melting Point (Tm) | °C. | 220 | 220 | 219 | 219 |
|  |  | η$_r$ | — | 1.89 | 2.01 | 1.36 | 1.37 |
|  |  | Weight Average Molecular Weight (Mw) |  | 30,000 | 30,000 | 24,000 | 24,000 |
|  |  | Number Average Molecular Weight (Mn) |  | 14,000 | 14,000 | 12,000 | 12,000 |
|  |  | Melt Viscosity | Pa · s | 13.8 | 18.6 | 2.3 | 2.3 |
| Termal Stability during Melt Retention | Content Retention Rate | % | 86 | 84 | 84 | 82 |
|  | Melt Viscosity Retention Rate | % | 118 | 119 | 121 | 123 |
|  | Weight Average Molecular Weight Retention Rate | % | 124 | 127 | 78 | 76 |
|  | Weight Reduction Rate | % | 3.7 | 3.8 | 4.5 | 4.6 |
| Mechanical Property | Tensile Elongation at Break | % | >200 | >200 | 120 | 120 |
| Impregnation Property | Melting Point (Tm) + 30° C. | — | bad | bad | good | good |
|  | Melting Point (Tm) + 60° C. | — | good | bad | good | good |
|  | Melting Point (Tm) + 100° C. | — | good | good | good | good |
| Surface Quality | Melting Point (Tm) + 30° C. | — | bad | bad | good | good |
|  | Melting Point (Tm) + 60° C. | — | bad | bad | good | good |
|  | Melting Point (Tm) + 100° C. | — | good | good | good | good |

TABLE 5

|  |  |  | Comparative Example 1 | Comparative Example 2 | Comparative Example 3 |
|---|---|---|---|---|---|
| Raw Materials | ε-caprolactam | g | 13 | 13 | 13 |
|  | "JEFFAMINE" M1000 | g | 0.0 | 0.0 | 0.0 |
|  | "JEFFAMINE" M2070 | g | — | — | — |
|  | "JEFFAMINE" M600 | g | — | — | — |
|  | Benzoic acid | g | — | — | — |
|  | Ion-exchange water | g | 13 | 13 | 13 |
|  | CF (T700S-12K) | volume % | 50 | 50 | 50 |
| Nitrogen Flow time |  | min | 120 | 30 | 150 |
| Polymer Properties | End Structure [I] | mass % | 0 | 0 | 0 |
|  | Amount [II] | mass % | 0.00 | 0.00 | 0.00 |
|  | [I] | mol/t | 0 | 0 | 0 |
|  | [II] | mol/t | 0 | 0 | 0 |
|  | Total Mole [I] + [II] | mol/t | 0 | 0 | 0 |
|  | Mole Ratio [I]/[II] | — | 0.00 | 0.00 | 0.00 |
|  | [NH$_2$] | mol/t | 68 | 96 | 33 |
|  | [COOH] | mol/t | 70 | 112 | 43 |
|  | Total Mole [NH$_2$][COOH] | mol/t | 138 | 208 | 76 |
|  | Mole Ratio [NH$_2$]/[COOH] | — | 0.97 | 0.86 | 0.77 |
|  | Melting Point (Tm) | °C. | 219 | 219 | 219 |
|  | η$_r$ | — | 2.40 | 2.03 | 3.47 |
|  | Weight Average Molecular Weight (Mw) |  | 60,000 | 34,000 | 67,000 |
|  | Number Average Molecular Weight (Mn) |  | 25,000 | 16,000 | 17,000 |
|  | Melt Viscosity | Pa · s | 417.0 | 44.0 | 840.0 |
| Termal Stability during Melt Retention | Content Retention Rate | % | — | — | — |
|  | Melt Viscosity Retention Rate | % | 133 | 121 | 104 |
|  | Weight Average Molecular Weight Retention Rate | % | 106 | 122 | 88 |
|  | Weight Reduction Rate | % | 3.1 | 5.9 | 2.3 |
| Mechanical Property (Polymer) | Tensile Elongation at Break | % | >200 | >200 | >200 |
| Impregnation Property | Melting Point (Tm) + 30° C. | — | bad | bad | bad |
|  | Melting Point (Tm) + 60° C. | — | bad | bad | bad |
|  | Melting Point (Tm) + 100° C. | — | bad | good | bad |

TABLE 5-continued

|  |  |  | Comparative Example 1 | Comparative Example 2 | Comparative Example 3 |
|---|---|---|---|---|---|
| Surface Quality | Melting Point (Tm) + 30° C. | — | bad | bad | bad |
|  | Melting Point (Tm) + 60° C. | — | bad | bad | bad |
|  | Melting Point (Tm) + 100° C. | — | bad | bad | bad |

TABLE 6

|  |  |  |  | Example 40 | Example 41 |
|---|---|---|---|---|---|
| Raw Materials | Hexamethylenediamine |  | g | 9.46 | 7.74 |
|  | Adipic acid |  | g | 11.9 | — |
|  | Sebacic acid |  | g | — | 13.46 |
|  | "JEFFAMINE" M1000 |  | g | 1.6 | 1.6 |
|  | "JEFFAMINE" M2070 |  | g | — | — |
|  | "JEFFAMINE" M600 |  | g | — | — |
|  | Benzoic acid |  | g | 0.14 | 0.14 |
|  | Ion-exchange water |  | g | 20 | 20 |
|  | CF (T700S-12K) |  | volume % | 50 | 50 |
| Nitrogen Flow time |  |  | min | 240 | 240 |
| Polymer Properties | End Structure | [I] | mass % | 7.3 | 7.3 |
|  | Amount | [II] | mass % | 0.48 | 0.49 |
|  |  | [I] | mol/t | 73 | 73 |
|  |  | [II] | mol/t | 46 | 47 |
|  | Total Mole [I] + [II] |  | mol/t | 119 | 120 |
|  | Mole Ratio [I]/[II] |  | — | 1.60 | 1.56 |
|  | [NH$_2$] |  | mol/t | 71 | 70 |
|  | [COOH] |  | mol/t | 39 | 38 |
|  | Total Mole [NH$_2$][COOH] |  | mol/t | 110 | 108 |
|  | Mole Ratio [NH$_2$]/[COOH] |  | — | 1.82 | 1.84 |
|  | Melting Point (Tm) |  | ° C. | 260 | 222 |
|  | $\eta_r$ |  | — | 1.85 | 1.86 |
|  | Weight Average Molecular Weight (Mw) |  |  | 30,000 | 30,000 |
|  | Number Average Molecular Weight (Mn) |  |  | 15,000 | 15,000 |
|  | Melt Viscosity |  | Pa · s | 5.8 | 6.1 |
| Termal Stability during Melt Retention | Content Retention Rate |  | % | 92 | 92 |
|  | Melt Viscosity Retention Rate |  | % | 105 | 106 |
|  | Weight Average Molecular Weight Retention Rate |  | % | 107 | 106 |
|  | Weight Reduction Rate |  | % | 2.8 | 2.9 |
| Mechanical Property | Tensile Elongation at Break |  | % | >200 | >200 |
| Impregnation Property | Melting Point (Tm) + 30° C. |  | — | good | good |
|  | Melting Point (Tm) + 60° C. |  | — | good | good |
|  | Melting Point (Tm) + 100° C. |  | — | good | good |
| Surface Quality | Melting Point (Tm) + 30° C. |  | — | good | good |
|  | Melting Point (Tm) + 60° C. |  | — | good | good |
|  | Melting Point (Tm) + 100° C. |  | — | good | good |

TABLE 7

|  |  |  |  | Example 42 | Example 43 | Example 44 | Example 45 | Example 46 |
|---|---|---|---|---|---|---|---|---|
| Raw Materials | ε-caprolactam |  | g | 20 | 20 | 20 | 20 | 20 |
|  | "JEFFAMINE" M1000 |  | g | 1.6 | 2.1 | 0.5 | 1.0 | 1.3 |
|  | "JEFFAMINE" M2070 |  | g | — | — | — | — | — |
|  | "JEFFAMINE" M600 |  | g | — | — | — | — | — |
|  | Benzoic acid |  | g | 0.14 | 0.14 | 0.14 | 0.14 | 0.14 |
|  | Ion-exchange water |  | g | 20 | 20 | 20 | 20 | 20 |
|  | CF (T700S-12K) |  | volume % | 30 | 30 | 30 | 30 | 30 |
| Nitrogen Flow time |  |  | min | 240 | 240 | 150 | 180 | 210 |
| Polymer Properties | End Structure | [I] | mass % | 6.7 | 8.8 | 2.3 | 4.1 | 5.3 |
|  | Amount | [II] | mass % | 0.48 | 0.46 | 0.49 | 0.48 | 0.48 |
|  |  | [I] | mol/t | 67 | 88 | 24 | 41 | 53 |
|  |  | [II] | mol/t | 46 | 44 | 47 | 46 | 46 |
|  | Total Mole [I] + [II] |  | mol/t | 113 | 132 | 71 | 87 | 99 |

TABLE 7-continued

|  |  |  |  |  |  |  |  |
|---|---|---|---|---|---|---|---|
|  | Mole Ratio [I]/[II] | — | 1.47 | 2.02 | 0.51 | 0.90 | 1.16 |
|  | [NH₂] | mol/t | 73 | 91 | 60 | 66 | 70 |
|  | [COOH] | mol/t | 44 | 54 | 88 | 69 | 59 |
|  | Total Mole [NH₂][COOH] | mol/t | 117 | 145 | 148 | 135 | 129 |
|  | Mole Ratio [NH₂]/[COOH] | — | 1.66 | 1.69 | 0.68 | 0.96 | 1.19 |
|  | Melting Point (Tm) | ° C. | 220 | 220 | 220 | 220 | 220 |
|  | η_r | — | 1.81 | 1.63 | 2.09 | 1.98 | 1.87 |
|  | Weight Average Molecular Weight (Mw) |  | 30,000 | 24,000 | 30,000 | 30,000 | 30,000 |
|  | Number Average Molecular Weight (Mn) |  | 15,000 | 14,000 | 15,000 | 15,000 | 15,000 |
|  | Melt Viscosity | Pa·s | 5.5 | 2.9 | 14.8 | 11.7 | 8.9 |
| Termal Stability during Melt Retention | Content Retention Rate | % | 92 | 90 | 93 | 93 | 93 |
|  | Melt Viscosity Retention Rate | % | 104 | 109 | 107 | 108 | 106 |
|  | Weight Average Molecular Weight Retention Rate | % | 107 | 109 | 107 | 105 | 109 |
|  | Weight Reduction Rate | % | 2.4 | 2.7 | 2.7 | 2.4 | 2.5 |
| Mechanical Property | Tensile Elongation at Break | % | >200 | >200 | >200 | >200 | >200 |
| Impregnation Property | Melting Point (Tm) + 10° C. | — | good | good | bad | bad | good |
|  | Melting Point (Tm) + 20° C. | — | good | good | good | good | good |
|  | Melting Point (Tm) + 30° C. | — | good | good | good | good | good |
| Surface Quality | Melting Point (Tm) + 10° C. | — | good | good | bad | bad | good |
|  | Melting Point (Tm) + 20° C. | — | good | good | bad | good | good |
|  | Melting Point (Tm) + 30° C. | — | good | good | good | good | good |

|  |  |  |  | Example 47 | Example 48 | Example 49 | Example 50 |
|---|---|---|---|---|---|---|---|
| Raw Materials | ε-caprolactam |  | g | 20 | 20 | 20 | 20 |
|  | "JEFFAMINE" M1000 |  | g | 1.3 | 1.3 | 1.3 | 2.7 |
|  | "JEFFAMINE" M2070 |  | g | — | — | — | — |
|  | "JEFFAMINE" M600 |  | g | — | — | — | — |
|  | Benzoic acid |  | g | 0.14 | 0.14 | 0.07 | 0.35 |
|  | Ion-exchange water |  | g | 20 | 20 | 20 | 20 |
|  | CF (T700S-12K) |  | volume % | 30 | 30 | 30 | 30 |
|  | Nitrogen Flow time |  | min | 360 | 300 | 180 | 240 |
| Polymer Properties | End Structure Amount | [I] | mass % | 5.3 | 5.3 | 5.3 | 11.5 |
|  |  | [II] | mass % | 0.48 | 0.48 | 0.24 | 1.19 |
|  |  | [I] | mol/t | 53 | 53 | 53 | 115 |
|  |  | [II] | mol/t | 46 | 46 | 23 | 113 |
|  | Total Mole [I] + [II] |  | mol/t | 99 | 99 | 76 | 228 |
|  | Mole Ratio [I]/[II] |  | — | 1.16 | 1.16 | 2.32 | 1.02 |
|  | [NH₂] |  | mol/t | 31 | 40 | 90 | 72 |
|  | [COOH] |  | mol/t | 22 | 29 | 59 | 70 |
|  | Total Mole [NH₂][COOH] |  | mol/t | 53 | 69 | 149 | 142 |
|  | Mole Ratio [NH₂]/[COOH] |  | — | 1.41 | 1.38 | 1.53 | 1.03 |
|  | Melting Point (Tm) |  | ° C. | 220 | 220 | 220 | 219 |
|  | η_r |  | — | 2.58 | 2.05 | 1.85 | 1.23 |
|  | Weight Average Molecular Weight (Mw) |  |  | 56,000 | 43,000 | 30,000 | 17,000 |
|  | Number Average Molecular Weight (Mn) |  |  | 25,000 | 21,000 | 15,000 | 8,000 |
|  | Melt Viscosity |  | Pa·s | 19.7 | 13.7 | 8.7 | 1.9 |
| Termal Stability during Melt Retention | Content Retention Rate |  | % | 96 | 94 | 89 | 91 |
|  | Melt Viscosity Retention Rate |  | % | 106 | 106 | 109 | 108 |
|  | Weight Average Molecular Weight Retention Rate |  | % | 109 | 109 | 109 | 106 |
|  | Weight Reduction Rate |  | % | 2.5 | 2.4 | 2.8 | 2.8 |
| Mechanical Property | Tensile Elongation at Break |  | % | >200 | >200 | >200 | 105 |
| Impregnation Property | Melting Point (Tm) + 10° C. |  | — | bad | bad | good | good |
|  | Melting Point (Tm) + 20° C. |  | — | bad | good | good | good |
|  | Melting Point (Tm) + 30° C. |  | — | good | good | good | good |
| Surface Quality | Melting Point (Tm) + 10° C. |  | — | bad | bad | good | good |
|  | Melting Point (Tm) + 20° C. |  | — | bad | bad | good | good |
|  | Melting Point (Tm) + 30° C. |  | — | good | good | good | good |

TABLE 8

|  |  |  | Example 51 | Example 52 | Example 53 | Example 54 | Example 55 | Example 56 |
|---|---|---|---|---|---|---|---|---|
| Raw Materials | ε-caprolactam | g | 20 | 20 | 20 | 20 | 20 | 20 |
|  | "JEFFAMINE" M1000 | g | — | — | — | — | 3.1 | 3.1 |
|  | "JEFFAMINE" M2070 | g | 1.6 | 2.4 | 3.5 | — | — | — |

TABLE 8-continued

| | | | | | | | | |
|---|---|---|---|---|---|---|---|---|
| | "JEFFAMINE" M600 | g | — | — | — | 1.6 | — | — |
| | Benzoic acid | g | 0.14 | 0.14 | 0.14 | 0.21 | 0.41 | 0.41 |
| | Ion-exchange water | g | 20 | 20 | 20 | 20 | 20 | 20 |
| | CF (T700S-12K) | volume % | 30 | 30 | 30 | 30 | 30 | 30 |
| | Nitrogen Flow time | min | 240 | 270 | 300 | 240 | 360 | 360 |
| Polymer Properties | End Structure Amount [I] | mass % | 6.7 | 10.6 | 15.2 | 6.7 | 13 | 13 |
| | [II] | mass % | 0.49 | 0.49 | 0.49 | 0.73 | 1.42 | 1.42 |
| | [I] | mol/t | 37 | 53 | 76 | 91 | 130 | 130 |
| | [II] | mol/t | 47 | 47 | 47 | 70 | 135 | 135 |
| | Total Mole [I] + [II] | mol/t | 84 | 100 | 123 | 161 | 265 | 265 |
| | Mole Ratio [I]/[II] | — | 0.79 | 1.13 | 1.63 | 1.31 | 0.96 | 0.96 |
| | [NH$_2$] | mol/t | 74 | 67 | 67 | 39 | 65 | 10 |
| | [COOH] | mol/t | 75 | 59 | 35 | 19 | 65 | 10 |
| | Total Mole [NH$_2$]/[COOH] | mol/t | 149 | 126 | 102 | 58 | 130 | 20 |
| | Mole Ratio [NH$_2$]/[COOH] | — | 0.99 | 1.14 | 1.91 | 2.05 | 1.00 | 1.00 |
| | Melting Point (Tm) | °C. | 220 | 218 | 217 | 220 | 219 | 219 |
| | η$_r$ | — | 1.96 | 1.43 | 1.29 | 1.92 | 1.18 | 1.34 |
| | Weight Average Molecular Weight (Mw) | | 30,000 | 30,000 | 30,000 | 30,000 | 17,000 | 24,000 |
| | Number Average Molecular Weight (Mn) | | 15,000 | 15,000 | 15,000 | 15,000 | 9,000 | 12,000 |
| | Melt Viscosity | Pa·s | 9.7 | 6.1 | 3.1 | 10.2 | 1.6 | 2.2 |
| Termal Stability during Melt Retention | Content Retenton Rate | % | 94 | 89 | 86 | 91 | 81 | 83 |
| | Melt Viscosity Retention Rate | % | 105 | 105 | 105 | 105 | 132 | 121 |
| | Weight Average Molecular Weight Retention Rate | % | 109 | 109 | 109 | 109 | 106 | 81 |
| | Weight Reduction Rate | % | 2.8 | 3.0 | 3.3 | 2.8 | 3.9 | 3.6 |
| Mechanical Property | Tensile Elongation at Break | % | >200 | >200 | 175 | >200 | 75 | 120 |
| Impregnation Property | Melting Point (Tm) + 10° C. | — | good | good | good | bad | good | good |
| | Melting Point (Tm) + 20° C. | — | good | good | good | good | good | good |
| | Melting Point (Tm) + 30° C. | — | good | good | good | good | good | good |
| Surface Quality | Melting Point (Tm) + 10° C. | — | good | good | good | bad | good | good |
| | Melting Point (Tm) + 20° C. | — | good | good | good | good | good | good |
| | Melting Point (Tm) + 30° C. | — | good | good | good | good | good | good |

| | | | Example 57 | Example 58 | Example 59 | Example 60 | Example 61 | Example 62 |
|---|---|---|---|---|---|---|---|---|
| Raw Materials | ε-caprolactam | g | 20 | 20 | 20 | 20 | 20 | 20 |
| | "JEFFAMINE" M1000 | g | 0.3 | 2.1 | 1.9 | 1.9 | 0.5 | 0.5 |
| | "JEFFAMINE" M2070 | g | — | — | — | — | — | — |
| | "JEFFAMINE" M600 | g | — | — | — | — | — | — |
| | Benzoic acid | g | 0.04 | 0.08 | 0.08 | 0.08 | 0.29 | 0.29 |
| | Ion-exchange water | g | 20 | 20 | 20 | 20 | 20 | 20 |
| | CF (T700S-12K) | volume % | 30 | 30 | 30 | 30 | 30 | 30 |
| | Nitrogen Flow time | min | 60 | 180 | 210 | 150 | 360 | 300 |
| Polymer Properties | End Structure Amount [I] | mass % | 1.1 | 8.6 | 8.1 | 8.6 | 2.0 | 2.0 |
| | [II] | mass % | 0.12 | 0.26 | 0.26 | 0.26 | 0.98 | 0.99 |
| | [I] | mol/t | 11 | 86 | 81 | 81 | 20 | 20 |
| | [II] | mol/t | 11 | 25 | 25 | 25 | 94 | 95 |
| | Total Mole [I] + [II] | mol/t | 22 | 111 | 106 | 106 | 114 | 115 |
| | Mole Ratio [I]/[II] | — | 0.96 | 3.45 | 3.25 | 3.25 | 0.21 | 0.21 |
| | [NH$_2$] | mol/t | 98 | 97 | 86 | 104 | 24 | 58 |
| | [COOH] | mol/t | 99 | 50 | 29 | 55 | 92 | 118 |
| | Total Mole [NH$_2$]/[COOH] | mol/t | 197 | 147 | 115 | 159 | 116 | 176 |
| | Mole Ratio [NH$_2$]/[COOH] | — | 0.99 | 1.94 | 2.97 | 1.89 | 0.26 | 0.49 |
| | Melting Point (Tm) | °C. | 218 | 221 | 221 | 221 | 219 | 219 |
| | η$_r$ | — | 2.04 | 1.54 | 1.71 | 1.48 | 1.99 | 1.79 |
| | Weight Average Molecular Weight (Mw) | | 30,000 | 24,000 | 30,000 | 24,000 | 30,000 | 24,000 |
| | Number Average Molecular Weight (Mn) | | 15,000 | 12,000 | 15,000 | 12,000 | 15,000 | 12,000 |
| | Melt Viscosity | Pa·s | 19.6 | 2.9 | 4.6 | 3.6 | 16.7 | 12.7 |
| Termal Stability during Melt Retention | Content Retenton Rate | % | 82 | 84 | 81 | 81 | 84 | 81 |
| | Melt Viscosity Retention Rate | % | 119 | 117 | 117 | 117 | 113 | 118 |
| | Weight Average Molecular Weight Retention Rate | % | 117 | 108 | 84 | 119 | 84 | 116 |
| | Weight Reduction Rate | % | 3.7 | 3.6 | 3.7 | 3.8 | 3.5 | 3.8 |
| Mechanical Property | Tensile Elongation at Break | % | 140 | 105 | 150 | 120 | 175 | 105 |
| Impregnation Property | Melting Point (Tm) + 10° C. | — | bad | good | good | good | bad | bad |
| | Melting Point (Tm) + 20° C. | — | bad | good | good | good | bad | good |
| | Melting Point (Tm) + 30° C. | — | good | good | good | good | good | good |

TABLE 8-continued

| Surface Quality | Melting Point (Tm) + 10° C. | — | bad | good | good | good | bad | bad |
| --- | --- | --- | --- | --- | --- | --- | --- | --- |
| | Melting Point (Tm) + 20° C. | — | bad | good | good | good | bad | good |
| | Melting Point (Tm) + 30° C. | — | good | good | good | good | good | good |

TABLE 9

| | | | Example 63 | Example 64 | Example 65 | Example 66 | Example 67 |
| --- | --- | --- | --- | --- | --- | --- | --- |
| Raw Materials | ε-caprolactam | g | 20 | 20 | 20 | 20 | 20 |
| | "JEFFAMINE" M1000 | g | 1.3 | 1.6 | 1.0 | 1.0 | 2.2 |
| | "JEFFAMINE" M2070 | g | — | — | — | — | — |
| | "JEFFAMINE" M600 | g | — | — | — | — | — |
| | Benzoic acid | g | 0.18 | 0.14 | 0.25 | 0.25 | 0.14 |
| | Ion-exchange water | g | 20 | 20 | 20 | 20 | 20 |
| | CF (T700S-12K) | volume % | 30 | 30 | 30 | 30 | 30 |
| | Nitrogen Flow time | min | 360 | 180 | 240 | 120 | 300 |
| Polymer Properties | End Structure Amount [I] | mass % | 5.3 | 6.7 | 4.1 | 4.1 | 9.1 |
| | [II] | mass % | 0.60 | 0.44 | 0.87 | 0.87 | 0.44 |
| | [I] | mol/t | 53 | 67 | 41 | 41 | 91 |
| | [II] | mol/t | 57 | 42 | 80 | 80 | 42 |
| | Total Mole [I] + [II] | mol/t | 110 | 109 | 121 | 121 | 133 |
| | Mole Ratio [I]/[II] | — | 0.93 | 1.61 | 0.51 | 0.51 | 2.19 |
| | [$NH_2$] | mol/t | 22 | 100 | 25 | 70 | 71 |
| | [COOH] | mol/t | 24 | 70 | 70 | 100 | 21 |
| | Total Mole [$NH_2$][COOH] | mol/t | 46 | 170 | 95 | 170 | 92 |
| | Mole Ratio [$NH_2$]/[COOH] | — | 0.92 | 1.43 | 0.36 | 0.70 | 3.38 |
| | Melting Point (Tm) | ° C. | 220 | 220 | 220 | 221 | 220 |
| | $\eta_r$ | — | 2.04 | 1.68 | 1.92 | 1.76 | 1.61 |
| | Weight Average Molecular Weight (Mw) | | 43,000 | 24,000 | 30,000 | 24,000 | 30,000 |
| | Number Average Molecular Weight (Mn) | | 22,000 | 12,000 | 15,000 | 12,000 | 15,000 |
| | Melt Viscosity | Pa · s | 14.8 | 4.5 | 9.0 | 7.1 | 4.0 |
| Termal Stability during Melt Retention | Content Retention Rate | % | 93 | 87 | 88 | 87 | 87 |
| | Melt Viscosity Retention Rate | % | 88 | 114 | 112 | 114 | 113 |
| | Weight Average Molecular Weight Retention Rate | % | 86 | 113 | 89 | 114 | 88 |
| | Weight Reduction Rate | % | 2.1 | 3.3 | 3.3 | 3.4 | 3.2 |
| Mechanical Property | Tensile Elongation at Break | % | >200 | 175 | 190 | 150 | 190 |
| Impregnation Property | Melting Point (Tm) + 10° C. | — | bad | good | good | good | good |
| | Melting Point (Tm) + 20° C. | — | bad | good | good | good | good |
| | Melting Point (Tm) + 30° C. | — | good | good | good | good | good |
| Surface Quality | Melting Point (Tm) + 10° C. | — | bad | good | good | good | good |
| | Melting Point (Tm) + 20° C. | — | bad | good | good | good | good |
| | Melting Point (Tm) + 30° C. | — | good | good | good | good | good |

| | | | Example 68 | Example 69 | Example 70 | Example 71 |
| --- | --- | --- | --- | --- | --- | --- |
| Raw Materials | ε-caprolactam | g | 20 | 20 | 20 | 20 |
| | "JEFFAMINE" M1000 | g | 6.0 | 1.6 | 1.6 | 1.6 |
| | "JEFFAMINE" M2070 | g | — | — | — | — |
| | "JEFFAMINE" M600 | g | — | — | — | — |
| | Benzoic acid | g | 0.14 | 0.01 | 1.62 | 0.00 |
| | Ion-exchange water | g | 20 | 20 | 20 | 20 |
| | CF (T700S-12K) | volume % | 30 | 30 | 30 | 30 |
| | Nitrogen Flow time | min | 240 | 180 | 240 | 240 |
| Polymer Properties | End Structure Amount [I] | mass % | 25 | 6.7 | 6.7 | 6.8 |
| | [II] | mass % | 0.44 | 0.04 | 5.56 | 0.00 |
| | [I] | mol/t | 250 | 67 | 67 | 68 |
| | [II] | mol/t | 42 | 4 | 530 | 0 |
| | Total Mole [I] + [II] | mol/t | 292 | 71 | 597 | 68 |
| | Mole Ratio [I]/[II] | — | 6.02 | 16.12 | 0.13 | — |
| | [$NH_2$] | mol/t | 230 | 110 | 20 | 114 |
| | [COOH] | mol/t | 20 | 44 | 420 | 42 |
| | Total Mole [$NH_2$][COOH] | mol/t | 250 | 154 | 440 | 156 |
| | Mole Ratio [$NH_2$]/[COOH] | — | 11.50 | 2.50 | 0.05 | 2.71 |
| | Melting Point (Tm) | ° C. | 217 | 220 | 215 | 220 |
| | $\eta_r$ | — | 1.22 | 1.83 | 1.07 | 1.83 |
| | Weight Average Molecular Weight (Mw) | | 12,000 | 30,000 | 7,000 | 30,000 |
| | Number Average Molecular Weight (Mn) | | 6,000 | 15,000 | 3,000 | 15,000 |

TABLE 9-continued

|  |  |  |  |  |  |  |
|---|---|---|---|---|---|---|
|  | Melt Viscosity | Pa · s | 0.6 | 5.5 | 1.3 | 5.5 |
| Termal Stability during Melt Retention | Content Retention Rate | % | 68 | 78 | 54 | 72 |
|  | Melt Viscosity Retention Rate | % | 183 | 154 | 304 | 171 |
|  | Weight Average Molecular Weight Retention Rate | % | 105 | 110 | 109 | 114 |
|  | Weight Reduction Rate | % | 7.2 | 4.5 | 9.6 | 5.2 |
| Mechanical Property | Tensile Elongation at Break | % | 15 | 95 | 3 | 90 |
| Impregnation Property | Melting Point (Tm) + 10° C. | — | good | good | good | good |
|  | Melting Point (Tm) + 20° C. | — | good | good | good | good |
|  | Melting Point (Tm) + 30° C. | — | good | good | good | good |
| Surface Quality | Melting Point (Tm) + 10° C. | — | good | good | good | good |
|  | Melting Point (Tm) + 20° C. | — | good | good | good | good |
|  | Melting Point (Tm) + 30° C. | — | good | good | good | good |

TABLE 10

|  |  |  | Example 72 | Example 73 | Example 74 | Example 75 | Example 76 |
|---|---|---|---|---|---|---|---|
| Raw Materials | ε-caprolactam | g | 20 | 20 | 20 | 20 | 20 |
|  | "JEFFAMINE" M1000 | g | 1.6 | 1.6 | 1.6 | 1.6 | — |
|  | "JEFFAMINE" M2070 | g | — | — | — | — | 3.5 |
|  | "JEFFAMINE" M600 | g | — | — | — | — | — |
|  | Benzoic acid | g | — | — | — | — | — |
|  | Acetic acid | g | 0.07 | — | — | — | — |
|  | Stearic acid | g | — | 0.32 | 0.81 | — | — |
|  | Cerotic acid | g | — | — | — | 1.14 | 1.14 |
|  | Ion-exchange water | g | 20 | 20 | 20 | 20 | 20 |
|  | CF (T700S-12K) | volume % | 30 | 30 | 30 | 30 | 30 |
| Nitrogen Flow time | | min | 200 | 260 | 300 | 300 | 300 |
| Polymer Properties | End Structure [I] | mass % | 6.7 | 6.7 | 6.7 | 6.7 | 15.2 |
|  | Amount [II] | mass % | 0.24 | 0.55 | 2.74 | 3.87 | 3.87 |
|  | [I] | mol/t | 67 | 67 | 67 | 67 | 76 |
|  | [II] | mol/t | 46 | 46 | 113 | 113 | 112 |
| Total Mole [I] + [II] | | mol/t | 113 | 113 | 180 | 180 | 188 |
| Mole Ratio [I]/[II] | | — | 1.47 | 1.46 | 0.59 | 0.59 | 0.68 |
| [NH$_2$] | | mol/t | 74 | 73 | 35 | 35 | 32 |
| [COOH] | | mol/t | 44 | 44 | 69 | 70 | 61 |
| Total Mole [NH$_2$]/[COOH] | | mol/t | 118 | 117 | 104 | 105 | 93 |
| Mole Ratio [NH$_2$]/[COOH] | | — | 1.68 | 1.66 | 0.51 | 0.50 | 0.52 |
| Melting Point (Tm) | | ° C. | 220 | 220 | 220 | 220 | 220 |
| η$_r$ | | — | 1.82 | 1.81 | 1.64 | 1.63 | 1.64 |
| Weight Average Molecular Weight (Mw) | | | 30,000 | 30,000 | 24,000 | 24,000 | 24,000 |
| Number Average Molecular Weight (Mn) | | | 15,000 | 15,000 | 12,000 | 12,000 | 12,000 |
|  | Melt Viscosity | Pa · s | 5.1 | 5.7 | 2.9 | 3.1 | 3.1 |
| Termal Stability during Melt Retention | Content Retention Rate | % | 93 | 92 | 90 | 90 | 90 |
|  | Melt Viscosity Retention Rate | % | 103 | 105 | 109 | 109 | 109 |
|  | Weight Average Molecular Weight Retention Rate | % | 106 | 108 | 109 | 109 | 109 |
|  | Weight Reduction Rate | % | 2.3 | 2.5 | 2.7 | 2.7 | 2.7 |
| Mechanical Property | Tensile Elongation at Break | % | >200 | >200 | >200 | >200 | 160 |
| Impregnation Property | Melting Point (Tm) + 10° C. | — | good | good | good | good | good |
|  | Melting Point (Tm) + 20° C. | — | good | good | good | good | good |
|  | Melting Point (Tm) + 30° C. | — | good | good | good | good | good |
| Surface Quality | Melting Point (Tm) + 10° C. | — | good | good | good | good | good |
|  | Melting Point (Tm) + 20° C. | — | good | good | good | good | good |
|  | Melting Point (Tm) + 30° C. | — | good | good | good | good | good |

|  |  |  | Example 77 | Example 78 | Example 79 | Example 80 |
|---|---|---|---|---|---|---|
| Raw Materials | ε-caprolactam | g | 20 | 20 | 20 | 20 |
|  | "JEFFAMINE" M1000 | g | 0.6 | 0.4 | 3.1 | 3.1 |
|  | "JEFFAMINE" M2070 | g | — | — | — | — |
|  | "JEFFAMINE" M600 | g | — | — | — | — |
|  | Benzoic acid | g | 0.08 | 0.06 | 0.15 | 0.14 |
|  | Acetic acid | g | — | — | — | — |
|  | Stearic acid | g | — | — | — | — |
|  | Cerotic acid | g | — | — | — | — |
|  | Ion-exchange water | g | 20 | 20 | 20 | 20 |
|  | CF (T700S-12K) | volume % | 30 | 30 | 30 | 30 |
| Nitrogen Flow time | | min | 180 | 180 | 360 | 360 |
| Polymer | End Structure [I] | mass % | 2.5 | 1.7 | 13 | 13 |

TABLE 10-continued

|  | Properties | Amount | [II] | mass % | 0.26 | 0.19 | 1.42 | 1.42 |
|---|---|---|---|---|---|---|---|---|
|  |  |  | [I] | mol/t | 25 | 17 | 130 | 130 |
|  |  |  | [II] | mol/t | 25 | 18 | 48 | 44 |
|  |  | Total Mole [I] + [II] |  | mol/t | 50 | 35 | 178 | 174 |
|  |  | Mole Ratio [I]/[II] |  | — | 1.00 | 0.94 | 2.71 | 2.95 |
|  |  | [NH$_2$] |  | mol/t | 88 | 96 | 13 | 13 |
|  |  | [COOH] |  | mol/t | 87 | 93 | 96 | 100 |
|  |  | Total Mole [NH$_2$]/[COOH] |  | mol/t | 175 | 189 | 109 | 113 |
|  |  | Mole Ratio [NH$_2$]/[COOH] |  | — | 1.01 | 1.03 | 0.14 | 0.13 |
|  |  | Melting Point (Tm) |  | ° C. | 220 | 220 | 219 | 219 |
|  |  | η$_r$ |  | — | 1.89 | 2.01 | 1.36 | 1.37 |
|  |  | Weight Average Molecular Weight (Mw) |  |  | 30,000 | 30,000 | 24,000 | 24,000 |
|  |  | Number Average Molecular Weight (Mn) |  |  | 14,000 | 14,000 | 12,000 | 12,000 |
|  |  | Melt Viscosity |  | Pa · s | 13.8 | 18.6 | 2.3 | 2.3 |
|  | Termal Stability during Melt Retention | Content Retention Rate |  | % | 86 | 84 | 84 | 82 |
|  |  | Melt Viscosity Retention Rate |  | % | 118 | 119 | 121 | 123 |
|  |  | Weight Average Molecular Weight Retention Rate |  | % | 124 | 127 | 78 | 76 |
|  |  | Weight Reduction Rate |  | % | 3.7 | 3.8 | 4.5 | 4.6 |
|  | Mechanical Property | Tensile Elongation at Break |  | % | >200 | >200 | 120 | 120 |
|  | Impregnation Property | Melting Point (Tm) + 10° C. |  | — | bad | bad | good | good |
|  |  | Melting Point (Tm) + 20° C. |  | — | good | bad | good | good |
|  |  | Melting Point (Tm) + 30° C. |  | — | good | good | good | good |
|  | Surface Quality | Melting Point (Tm) + 10° C. |  | — | bad | bad | good | good |
|  |  | Melting Point (Tm) + 20° C. |  | — | bad | bad | good | good |
|  |  | Melting Point (Tm) + 30° C. |  | — | good | good | good | good |

TABLE 11

|  |  |  |  | Comparative Example | Comparative Example | Comparative Example |
|---|---|---|---|---|---|---|
| Raw Materials | ε-caprolactam |  | g | 13 | 13 | 13 |
|  | "JEFFAMINE" M1000 |  | g | 0.0 | 0.0 | 0.0 |
|  | "JEFFAMINE" M2070 |  | g | — | — | — |
|  | "JEFFAMINE" M600 |  | g | — | — | — |
|  | Benzoic acid |  | g | — | — | — |
|  | Ion-exchange water |  | g | 13 | 13 | 13 |
|  | CF (T700S-12K) |  | volume % | 30 | 30 | 30 |
|  | Nitrogen Flow time |  | min | 120 | 30 | 150 |
| Polymer Properties | End Structure | [I] | mass % | 0 | 0 | 0 |
|  | Amount | [II] | mass % | 0.00 | 0.00 | 0.00 |
|  |  | [I] | mol/t | 0 | 0 | 0 |
|  |  | [II] | mol/t | 0 | 0 | 0 |
|  | Total Mole [I] + [II] |  | mol/t | 0 | 0 | 0 |
|  | Mole Ratio [I]/[II] |  | — | 0.00 | 0.00 | 0.00 |
|  | [NH$_2$] |  | mol/t | 68 | 96 | 33 |
|  | [COOH] |  | mol/t | 70 | 112 | 43 |
|  | Total Mole [NH$_2$][COOH] |  | mol/t | 138 | 208 | 76 |
|  | Mole Ratio [NH$_2$]/[COOH] |  | — | 0.97 | 0.86 | 0.77 |
|  | Melting Point (Tm) |  | ° C. | 219 | 219 | 219 |
|  | η$_r$ |  | — | 2.40 | 2.03 | 3.47 |
|  | Weight Average Molecular Weight (Mw) |  |  | 60,000 | 34,000 | 67,000 |
|  | Number Average Molecular Weight (Mn) |  |  | 25,000 | 16,000 | 17,000 |
|  | Melt Viscosity |  | Pa · s | 417.0 | 44.0 | 840.0 |
| Termal Stability during Melt Retention | Content Retention Rate |  | % | — | — | — |
|  | Melt Viscosity Retention Rate |  | % | 133 | 121 | 104 |
|  | Weight Average Molecular Weight Retention Rate |  | % | 106 | 122 | 88 |
|  | Weight Reduction Rate |  | % | 3.1 | 5.9 | 2.3 |
| Mechanical Property | Tensile Elongation at Break |  | % | >200 | >200 | >200 |
| Impregnation Property | Melting Point (Tm) + 10° C. |  | — | bad | bad | bad |
|  | Melting Point (Tm) + 20° C. |  | — | bad | bad | bad |
|  | Melting Point (Tm) + 30° C. |  | — | bad | good | bad |

TABLE 11-continued

|  |  | Comparative Example | Comparative Example | Comparative Example |
|---|---|---|---|---|
| Surface Quality | Melting Point (Tm) + 10° C. | — | bad | bad | bad |
|  | Melting Point (Tm) + 20° C. | — | bad | bad | bad |
|  | Melting Point (Tm) + 30° C. | — | bad | bad | bad |

TABLE 12

|  |  |  | Example 81 | Example 82 |
|---|---|---|---|---|
| Raw Materials | Hexamethylenediamine | g | 9.46 | 7.74 |
|  | Adipic acid | g | 11.9 | — |
|  | Sebacic acid | g | — | 13.46 |
|  | "JEFFAMINE" M1000 | g | 1.6 | 1.6 |
|  | "JEFFAMINE" M2070 | g | — | — |
|  | "JEFFAMINE" M600 | g | — | — |
|  | Benzoic acid | g | 0.14 | 0.14 |
|  | Ion-exchange water | g | 20 | 20 |
|  | CF (T700S-12K) | volume % | 50 | 50 |
| Nitrogen Flow time |  | min | 240 | 240 |
| Polymer Properties | End Structure [I] | mass % | 7.3 | 7.3 |
|  | Amount [II] | mass % | 0.48 | 0.49 |
|  | [I] | mol/t | 73 | 73 |
|  | [II] | mol/t | 46 | 47 |
|  | Total Mole [I] + [II] | mol/t | 119 | 120 |
|  | Mole Ratio [I]/[II] | — | 1.60 | 1.56 |
|  | [NH$_2$] | mol/t | 71 | 70 |
|  | [COOH] | mol/t | 39 | 38 |
|  | Total Mole [NH$_2$][COOH] | mol/t | 110 | 108 |
|  | Mole Ratio [NH$_2$]/[COOH] | — | 1.82 | 1.84 |
|  | Melting Point (Tm) | ° C. | 260 | 222 |
|  | η$_r$ | — | 1.85 | 1.86 |
|  | Weight Average Molecular Weight (Mw) |  | 30,000 | 30,000 |
|  | Number Average Molecular Weight (Mn) |  | 15,000 | 15,000 |
|  | Melt Viscosity | Pa · s | 5.8 | 6.1 |
| Termal Stability during Melt Retention | Content Retention Rate | % | 92 | 92 |
|  | Melt Viscosity Retention Rate | % | 105 | 106 |
|  | Weight Average Molecular Weight Retention Rate | % | 107 | 106 |
|  | Weight Reduction Rate | % | 2.8 | 2.9 |
| Mechanical Property | Tensile Elongation at Break | % | >200 | >200 |
| Impregnation Property | Melting Point (Tm) + 10° C. | — | good | good |
|  | Melting Point (Tm) + 20° C. | — | good | good |
|  | Melting Point (Tm) + 30° C. | — | good | good |
| Surface Quality | Melting Point (Tm) + 10° C. | — | good | good |
|  | Melting Point (Tm) + 20° C. | — | good | good |
|  | Melting Point (Tm) + 30° C. | — | good | good |

Based on comparison between Examples 1 to 39 and Comparative Examples 1 to 3, it can be seen that continuous-fiber-reinforced polyamide resin base materials obtained using a fiber-reinforced end-modified polyamide 6 resin having, at an end group of the polymer, a structure constituted by a structural unit different from a repeating structural unit constituting the backbone of the polymer have an excellent impregnation property and thermal stability during melt retention, and can achieve reduction of void and improvement of the surface quality.

Based on comparison between Examples 42 to 80 and Comparative Examples 4 to 6, it can be seen that discontinuous-fiber-reinforced polyamide resin base materials obtained using a fiber-reinforced end-modified polyamide 6 resin having, at an end group of the polymer, a structure constituted by a structural unit different from a repeating structural unit constituting the backbone of the polymer have an excellent impregnation property and thermal stability during melt retention, and can achieve reduction of void and improvement of the surface quality.

Taking advantage of their excellent properties, fiber-reinforced polyamide resin base materials and molded articles thereof in the first and second modes of the present invention can be used for uses such as aircraft parts, automobile parts, electric or electronic parts, building components, containers, daily necessaries, miscellaneous daily goods, and sanitary articles. Fiber-reinforced polyamide resin base materials and molded articles thereof in embodiments of the present invention can be used especially preferably for peripheral parts for aircraft engines, exterior parts for aircraft parts, automobile body parts, vehicle skeletons, peripheral parts for automobile engines, automobile underhood parts, automobile gear parts, automobile interior parts, automobile exterior parts, intake/exhaust system parts, engine coolant system parts, automobile electrical equipment parts, and electric or electronic parts, which require an excellent impregnation property, heat aging resistance, and external surface appearance. More specifically, fiber-reinforced end-modified polyamide resins and molded articles thereof in embodiments of the present invention are preferably used for, for example, peripheral parts for aircraft engines such as fan blades; aircraft-related parts such as landing gear pods, winglets, spoilers, edges, ladders, elevators, fairings, and ribs; automobile body parts such as sheets, front bodies, underbodies, pillars, members, frames, beams, supports, rails, and hinges; peripheral parts for automobile engines, such as engine covers, air intake pipes, timing belt covers, intake manifolds, filler caps, throttle bodies, and cooling fans; automobile underhood parts such as cooling fans, tops and bases of radiator tanks, cylinder head covers, oil pans, brake piping, tubes for fuel piping, and waste gas system parts; automobile gear parts such as gears, actuators, bearing retainers, bearing cages, chain guides, and chain tensioners; automobile interior parts such as shift lever brackets, steering lock brackets, key cylinders, door inner handles, door handle cowls, interior mirror brackets, air conditioner switches, instrumental panels, console boxes, glove boxes, steering wheels, and trims; automobile exterior parts such as front fenders, rear fenders, fuel lids, door panels, cylinder head covers, door mirror stays, tail gate panels, license garnishes, roof rails, engine mount brackets, rear garnishes, rear spoilers, trunk lids, rocker moldings, moldings, lamp housings, front grilles, mud guards, and side bumpers; intake/exhaust system parts such as air intake manifolds, intercooler inlets, turbo chargers, exhaust pipe covers, inner bushes, bearing retainers, engine mounts, engine head covers, resonators, and throttle bodies; engine coolant system parts such as chain covers, thermostat housings, outlet pipes, radiator tanks, alternators, and delivery pipes; automobile electrical equipment parts such as connectors, wire harness connectors, motor parts, lamp sockets, sensor in-car switches, and combination switches; and electric or electronic parts such as electric parts including generators, electric motors, transformers, current transformers, voltage regulators, rectifiers, resistors, inverters, relays, power contacts, on/off switches, breakers, switches, knife switches, multipole rods, motor cases, television housings, housings and internal parts for notebook computers, housings and internal parts for CRT displays, housings and internal parts for printers, housings and internal parts for mobile terminals, for example, mobile phones, mobile computers, and hand-held type mobiles, housings for ICs and LEDs, condenser base plates, fuse holders, gears, cases, and cabinets, and electronic parts including connectors, connectors for SMT, card connectors, jacks, coils, coil bobbins, sensors, LED lamps, sockets, resistors, relays, relay cases, reflectors, compact switches, power source parts, coil bobbins, condensers, variable capacitor cases, optical pickup chassis, radiators, terminal boards, transformers, plugs, printed circuit boards, tuners, speakers, microphones, headphones, compact motors, magnetic head bases, power modules, Si power modules and SiC power modules, semiconductors, liquid crystals, FDD carriages, FDD chassis, motor brush holders, transformer members, parabolic antennas, and computer-related parts.

The invention claimed is:

1. A fiber-reinforced polyamide resin base material comprising continuous reinforcing fibers impregnated with a polyamide resin, wherein in the polyamide resin, at least part of the polymer constituting the polyamide resin is an end-modified polyamide resin having, at an end group of the polymer, a structure constituted by a structural unit different from a repeating structural unit constituting the backbone of the polymer, wherein the reinforcing fibers contain carbon fibers and wherein the reinforcing fibers are contained in an amount of 20 to 70% by volume with respect to the 100% by volume of the fiber-reinforced polyamide resin base material, wherein the end-modified polyamide resin contains an end structure represented by the following General Formula (I):

$$-X-(R^1-O)_m-R^2 \quad (I)$$

wherein in the General Formula (I), m represents a range of 2 to 100; $R^1$ represents a $C_2$-$C_{10}$ divalent hydrocarbon group; $R^2$ represents a $C_1$-$C_{30}$ monovalent hydrocarbon group; —X— represents —NH—, —N(CH$_3$)—, or —(C=O)—; and the $R^1$ of m-pieces contained in General Formula (I) may be either the same or different, wherein the end structure represented by the following General Formula (I) is present in an amount of 1 to 20% by mass with respect to 100% by mass of the end-modified polyamide resin, wherein the end-modified polyamide resin further contains an end structure represented by the following General Formula (II):

$$-Y-R^3 \quad (II)$$

wherein in the General Formula (II), $R^3$ represents a $C_1$-$C_{30}$ monovalent hydrocarbon group; in cases where X in the General Formula (I) is —NH— or —N(CH$_3$)—, —Y— in the General Formula (II) represents —(C=O)—; in cases where X in the General Formula (I) is —(C=O)—, Y in the General Formula (II) represents —NH— or —N(CH$_3$)—, and wherein the end structure represented by the General Formula (II) is present in an amount of 0.1 to 5% by mass with respect to 100% by mass of the end-modified polyamide resin.

2. The fiber-reinforced polyamide resin base material according to claim 1, wherein the reinforcing fibers are continuously aligned in one direction.

3. The fiber-reinforced polyamide resin base material according to claim 1, wherein the end-modified polyamide resin contains a total of 60 to 250 [mol/t] of the end structure represented by General Formula (I) and the end structure represented by General Formula (II), and wherein the ratio between the content [mol/t] of the end structure represented by General Formula (I) and the content [mol/t] of the end structure represented by General Formula (II) ((I)/(II)) is 0.3 to 2.5.

4. The fiber-reinforced polyamide resin base material according to claim 1, wherein the end-modified polyamide resin contains a total of 50 to 150 [mol/t] of amino end groups and carboxyl end groups, and wherein the ratio between the content [mol/t] of the amino end groups and the content [mol/t] of the carboxyl end groups (amino end groups/carboxyl end groups) is 0.5 to 2.5.

5. The fiber-reinforced polyamide resin base material according to claim 1, wherein the relative viscosity ($\eta_r$) of a solution of the end-modified polyamide resin at a resin concentration of 0.01 g/mL in 98% sulfuric acid at 25° C. is 1.3 to 3.0.

6. The fiber-reinforced polyamide resin base material according to claim 1, wherein the weight average molecular weight Mw of the end-modified polyamide resin as measured by gel permeation chromatography is 15,000 to 50,000.

7. The fiber-reinforced polyamide resin base material according to claim 1, wherein the melt viscosity of the end-modified polyamide resin at melting point+60° C. at a shear rate of 9728 sec$^{-1}$ is not more than 30 Pa·s.

8. The fiber-reinforced polyamide resin base material according to claim 1, wherein the content retention rate of the end structure represented by General Formula (I) of the end-modified polyamide resin after 60 minutes of retention at melting point+60° C. ((content after retention/content before retention)×100) is not less than 80%.

9. The fiber-reinforced polyamide resin base material according to claim 1, wherein the weight average molecular weight retention rate of the end-modified polyamide resin after 60 minutes of retention at melting point+60° C. ((weight average molecular weight after retention/weight average molecular weight before retention)×100) is 80% to 120%.

10. The fiber-reinforced polyamide resin base material according to claim 1, wherein the melt viscosity retention rate of the end-modified polyamide resin after 60 minutes of retention at melting point+60° C. ((melt viscosity after retention/melt viscosity before retention)×100) is 80% to 120%.

11. The fiber-reinforced polyamide resin base material according to claim 1, wherein the weight reduction rate of the end-modified polyamide resin after 40 minutes of retention under a nitrogen atmosphere at melting point+60° C. is not more than 4%.

12. A molded article comprising the fiber-reinforced polyamide resin base material according to claim 1.

13. A composite molded article comprising the fiber-reinforced polyamide resin base material according to claim 1 and a molded article containing a thermoplastic resin that are at least partly bonded to each other.

14. A method for producing the fiber-reinforced polyamide resin base material according to claim 1, the method at least comprising the steps of:

including, in polymerization of amino acid, lactam, and/or diamine and dicarboxylic acid, a terminal modification agent represented by the following General Formula (III):

$$H-X-(R^1-O)_m-R^2 \qquad (III)$$

at 1 to 20% by mass with respect to the total of the amino acid, lactam, diamine, and dicarboxylic acid, and allowing the terminal modification agent to bind to an end(s) of a polyamide resin to obtain an end-modified polyamide resin containing an end structure represented by the following General Formula (I):

$$-X-(R^1-O)_m-R^2 \qquad (I)$$

at 1 to 20% by mass; and impregnating continuous reinforcing fibers, or a reinforcing fiber base material in which discontinuous reinforcing fibers are dispersed, with the end-modified polyamide resin;

wherein in the General Formulae (III) and (I), m represents a range of 2 to 100; $R^1$ represents a $C_2$-$C_{10}$ divalent hydrocarbon group; $R^2$ represents a $C_1$-$C_{30}$ monovalent hydrocarbon group; in the General Formula (III), —X— represents —NH—, —N(CH$_3$)—, or —O(C=O)—; in the General Formula (I), —X— represents —NH—, —N(CH$_3$)—, or —(C=O)—; and the $R^1$ of m-pieces contained in General Formula (III) may be either the same or different.

* * * * *